United States Patent
Havre

(10) Patent No.: US 7,239,967 B2
(45) Date of Patent: Jul. 3, 2007

(54) METHOD, COMPUTER PROGRAM PRODUCT AND USE OF A COMPUTER PROGRAM FOR STABILIZING A MULTIPHASE FLOW

(75) Inventor: Kjetil Havre, Skedsmokorset (NO)

(73) Assignee: ABB Research Ltd., Zürich (CH)

( * ) Notice: Subject to any disclaimer, the term of this patent is extended or adjusted under 35 U.S.C. 154(b) by 0 days.

(21) Appl. No.: 10/433,653

(22) PCT Filed: Dec. 6, 2001
(Under 37 CFR 1.47)

(86) PCT No.: PCT/IB01/02323

§ 371 (c)(1),
(2), (4) Date: Jun. 9, 2004

(87) PCT Pub. No.: WO02/46577

PCT Pub. Date: Jun. 13, 2002

(65) Prior Publication Data

US 2006/0041392 A1 Feb. 23, 2006

(30) Foreign Application Priority Data

Dec. 6, 2000 (NO) .................................. 20006208

(51) Int. Cl.
*G01L 7/00* (2006.01)
*G01N 11/00* (2006.01)

(52) U.S. Cl. ......................................................... 702/50

(58) Field of Classification Search ................. 702/12, 702/45, 47, 50, 54, 100; 73/861, 861.18; 137/2, 171, 180; 95/19, 23

See application file for complete search history.

(56) References Cited

U.S. PATENT DOCUMENTS

| 4,916,617 A | 4/1990 | Norwood |
| 5,256,171 A | 10/1993 | Payne ............................ 95/19 |
| 5,494,067 A | 2/1996 | Levallois ..................... 137/154 |
| 5,544,672 A | 8/1996 | Payne et al. |

(Continued)

FOREIGN PATENT DOCUMENTS

GB 2358205 7/2001

(Continued)

OTHER PUBLICATIONS

English Translation of Markovich, SU 1000053, 1983.*

(Continued)

*Primary Examiner*—Michael Nghiem
(74) *Attorney, Agent, or Firm*—Venable LLP; Eric J. Franklin

(57) ABSTRACT

A method for stabilizing a multiphase flow in a flow line, where instability of the multiphase flow is caused by at least one slug. At least one pressure variable is continuously measured at a flow line inlet upstream of the point where the main part of the slug is generated. The pressure variable is supplied to a dynamic feedback controller, wherein the pressure variable upstream of the slug is an input to the dynamic feedback controller. An output of the dynamic feedback controller is continuously calculated. A control valve at said flow line is controlled by the output from the dynamic feedback controller, wherein the multiphase flow is stabilized throughout the flow line.

19 Claims, 19 Drawing Sheets

U.S. PATENT DOCUMENTS

| | | | |
|---|---|---|---|
| 6,041,803 A | 3/2000 | De Almeida et al. | 137/14 |
| 6,390,114 B1* | 5/2002 | Haandrikman et al. | 137/2 |
| 6,716,268 B2* | 4/2004 | Molyneux et al. | 95/22 |
| 2006/0151167 A1* | 7/2006 | Aarvik et al. | 166/267 |

FOREIGN PATENT DOCUMENTS

| | | |
|---|---|---|
| WO | 97/04212 | 2/1997 |
| WO | 00/00715 | 1/2000 |

OTHER PUBLICATIONS

K. Havre et al., Taming Slug Flow in Pipelines, Oil & Gas, pp. 55-63, ABB Review No. 4, Dec. 2000.

K. Havre et al., Active Feedback Control as the Solution to Severe Slugging, SPE 71540, 2001, pp. 1-16.

G. Franklin et al., Digital Control of Dynamic Systems, 2nd Edition, 1990.

B. Jansen et al., Automatic Control of Unstable Gas Lifted Wells, SPE 56832, 1999, pp. 1-9.

G. Haandrikman et al., Slug Control in Flowline/Riser Systems, Shell Global Solutions, Dept. of Fluid Flow and Thermodynamics, Shell Research and Technology Centre Amsterdam, 16 pgs., Proc. 2nd Int. Conf. Latest Advances ni Offshore Processing, Nov. 9-10, 1999.

C. Sarica et al., A New Technique to Eliminate Severe Slugging in Pipeline/Riser Systems, SPE 63185, 2000, pp. 1-9.

P. Hedne et al., Suppression of Terrain Slugging with Automatic and Manual Riser Choking, SINTEF Multiphase Flow Laboratory, Rondheim, Norway, pp. 453-460, 1990.

V. Henriot et al., Stimulation of Process to Control Severe Slugging: Application to the Dunbar Pipeline, SPE 56461, 1999, pp. 1-9.

F. Garnaud et al., New Field Methods for a Maximum Lift Gas Efficiency Through Stability, SPE 35555, 1996, pp. 1-8.

P. Lemetayer et al., Tool of the 90's to Optimize Gas-Lift Efficiency in the Gonelle Field, Gabon, SPE 23089, 1991, pp. 513-520.

A. Courbot, Prevention of Severe Slugging in the Dunbar 16 Multiphase Pipeline, OTC 8196, 1998, pp. 1-7, 1996.

PD Molyneux et al., Characterization and Active Control of Slugging in a Vertical Riser, BHR Group 2000 Multiphase Technology, pp. 161-172.

Dr. Z. Schmidt et al., Choking can Eliminate Severe Pipeline Slugging, Oil & Gas Journal, Nov. 12, 1979, pp. 230-238.

Z. Schmidt et al., Experimental Study of Severe Slugging in a Two-Phase-Flow Pipeline-Riser Pipe System, Soc. Of Petroleum Engineers Journal, Oct. 1980, pp. 407-414.

T. Drengstig et al., Slug Control of Production Pipeline, Oct. 12, 2001, 7 pgs.

Are Slugs Flooding Your Separators and Causing Production Losses?, Dril-Quip Solves Your Problem with its New $S^3$ Slug Suppression System 2000.

Y. Taitel, Stability of Severe Slugging, Int. J. Multiphase Flow, vol. 12, No. 2, 1986, pp. 203-217.

K. Havre, Inventor concerns regarding further patent applications based on Norwegian patent application 20006208, May 14, 2003, 1 page.

* cited by examiner

METHOD, COMPUTER PROGRAM PRODUCT AND USE OF A COMPUTER PROGRAM FOR STABILIZING A MULTIPHASE FLOW

CROSS-REFERENCE TO RELATED APPLICATIONS

This application claims priority to Norwegian patent application 20006208 filed Dec. 6, 2000 and is the national phase under 35 U.S.C. § 371 of PCT/IB01/02323, filed Dec. 6, 2001.

FIELD OF THE INVENTION

The present invention relates to a method for applying a dynamic feedback controller to stabilize multiphase flow in a flow line, such as a pipeline, riser or well production line, where slugs cause instability of the multiphase flow. The invention also relates to a computer program product, which carries out the steps of the method.

BACKGROUND OF THE INVENTION

Oil that is produced offshore is transported through pipelines as a complex mixture of oil, gas water and sand. One common flow regime is known as slug flow, in which the mixture flows intermittently along the pipelines and comprises a concentrated mass in the form of a liquid plug. Such a concentrated mass in movement is hereafter called a slug.

In multiphase pipelines/risers/well flow lines at reduced flow rates and/or changing gas oil ratio, compared to design specifications, instabilities in terms of terrain-induced and riser-induced slug flow often occur. Such a slug flow is a bulk of liquid moving in the pipeline followed by an amount of gas.

Terrain and riser-induced slug flow is often referred to as severe slugging. A publication by Yehuda Taitel, "Stability of Severe Slugging", Int. Journal of Multiphase Flow, Vol. 12, No. 2, pp. 203–217, 1986, describes the phenomena of slugging. Terrain and riser-induced slug flow is induced periodically as liquid in terms of oil and water is accumulated in lower parts of the pipeline/riser, see FIG. 11-IV. At a certain time the liquid will restrict the passage for the gas. In this situation a small amount of gas bubbles through the liquid plug, however the main part of the gas accumulates upstream of the liquid plug which causes the pressure to increase (see FIG. 11-I). In this situation the pressure upstream of the liquid plug is equal to the pressure downstream of the liquid plug plus the hydraulic pressure across the liquid plug (applying a static force balance). But when the pressure increase upstream of the liquid plug becomes larger than the pressure increase downstream the liquid plug, the liquid plug starts moving (see FIG. 11-II), and then forms a slug, which accelerates. It should be noted that this condition might be fulfilled before the front of the liquid plug reaches the downstream maximum point in the pipeline profile.

Depending on operating conditions and pipeline profile, the slug may die out or it may be transported to the outlet of the pipeline/riser. In a situation where the tail of the liquid plug enters the vertical parts of the flow line (FIG. 11-III), a rapid increase in the liquid flow rate occurs due to the unstable situation where the pressure head, due to the liquid column, decreases. A slug is formed and the slug get transported to the outlet of the pipeline, and when the gas behind the slug escapes the pipeline/riser, the remaining liquid in the vertical parts returns to the bottom of the riser or dips in the pipeline profile. Then the whole process is repeated, and the result is an unstable multiphase flow pattern/cycle where the liquid flow rate varies from zero to a significant value, as the slug passes a fixed point in the pipeline, in a short period of time. The flow pattern is characteristic of severe slugging (terrain/riser-induced slugging). For terrain-induced slug flow the corresponding liquid plugs are caused by terrain effects reflected in the pipeline profile (offshore and onshore), whereas riser induced slug flow is caused by the pipeline leaving the seabed on its way to the surface (offshore). For long risers, special dynamic effects might occur due to phase transition from liquid to gas due to a considerable pressure decrease in the riser. Different riser shapes may also affect the dynamics in riser-induced slugging.

Unstable flow causes considerable problems for production in the upstream wells and operation of the downstream processing plant:
  Large disturbances to the separator train, causing:
    Limiting separation capacity due to the need for larger operating margin to achieve the desired separation.
    Poor separation (water carry over to export pipeline) due to rapidly varying separator feed rates.
    Poor separation results in varying quality of water outlet from separators, causing large problems in the downstream water treatment system and possible violation of environmental restrictions.
  Large and rapidly varying compressor loads, causing:
    Inefficient compressor operation.
    Limiting compression capacity due to the need for a larger margin to handle gas holdup behind the liquid.
    Spurious flaring from limited compression capacity.
  Limited production from the upstream wells. The pressure variations at the pipeline or riser inlet 1 are also visible in the upstream wells, resulting in limited production from wells suffering from reduced lifting capacity.

For gas lifted oil wells a problem referred to as casing heading might occur. Applications of gas lifted oil wells are different than slug flow in pipelines, risers and wells in the following sense:
  The dynamic interactions in the casing heading are between the casing (conducting the gas to the injection point) and the tubing (flowline).

For gas lifted wells the gas injection rate (at some point) can be utilized for control, which gives additional degree of freedom.

There are four main categories of principles for avoiding or reducing the effects of slug flow:
1. Design changes
2. Operational changes
3. Procedures
4. Control methods:
  Feed forward control to separation unit
  Slug choking
  Active slug control An example of a typical slug handling technique that involves design changes is a technique that requires installation of slug catchers (onshore). Such design changes also have the disadvantage of that substantial capital investment is needed. Another example of such a technique is to increase the size of the first stage separators to provide buffer capacity. For already existing installations where problems with slug flow are present, and for compact separation units, these design changes have limited effects on flow stability.

Still, using this technique, compressors may trip due to large rapid variations in the feed rates to the separators caused by unstable multiphase flow.

An example of an operational change is to choke the pipeline to such an extent that the operation point is outside the unstable flow regime. But such an operational change may have the disadvantage of decreasing the output flow to a level substantially lower than the capacity of the pipeline. Severe variations of pressure along different positions of the pipeline may also occur.

Procedures are rule-based calculations applied by the operator. These are often used during pipeline, riser or well flow line startup. Such rule-based calculations may some extent decrease the magnitude of slugging and reduce the variations in pressure in the flow-line. But a problem is that the approach with rule-based calculations may only decrease the magnitude of slugging at certain operating conditions. And the operating conditions may vary widely.

Prior art control methods include:

Feed-forward control to a separation unit process control system. In this approach the slug is coped with inside the separation unit. U.S. Pat. No. 5,256,171 shows a method, which utilizes process measurements inside the separation unit.

U.S. Pat. No. 5,544,672 shows slug choking, which utilizes measurements downstream of the point of slug generation and chokes the pipeline control valve in the presence of a slug.

By conventional control methods one usually refers to feed-forward or slug choking. Conventional control methods may reduce the negative effects of slugging and flow variations in a pipeline. A remaining problem by applying conventional control methods is to stabilize the multiphase flow in a complete flow line and not only reducing the effect of slugging at a single point of the flow line, typically the outlet of the flow line. Another problem with conventional control methods is that they have not proven to be efficient enough when it comes to stabilize multiphase flow and particularly not in flow-lines comprising remote well-head platforms and subsea wells.

In the light of the problems mentioned above, the inventor has found that there is a need for a more efficient method for stabilizing multiphase flow caused by slugging.

SUMMARY OF THE INVENTION

An object of the invention is to provide a method, which stabilize a multiphase flow, in a flow line, where flow instability is caused by at least one slug. Measurement of pressure or temperature is taken upstream the point where the main part of the slug is generated. The pressure measurement, or an estimated pressure calculated from the temperature measurement, is supplied to a dynamic feedback controller which dynamic feedback controller calculates an output controlling at least one control valve, wherein the multiphase flow is stabilized throughout the complete flow line.

By a flow line is meant a line conducting transport of a multiphase mixture of oil, gas and water such as, a pipeline, riser or a well flow line.

Another object of the invention is to provide a computer program product, which performs the steps of the above-mentioned method including applying a control program or control law.

By a control valve is meant a valve or a choke equipped with an actuator suitable for automatic control, such as an electric motor as actuator with positioning control, a stepping motor or a pneumatic actuator.

An advantage of the present invention is that it improves the stability of operating conditions in production facilities for oil and/or gas. In particular the invention significantly reduce the disturbances in feed to the separation process by avoiding flow variation at the outlet of the multiphase flow line that connect wells and remote installation of the processing unit.

Another advantage of the invention, compared with a conventional control method, is that the invention reduces the pressure fluctuations at the flow line inlet. This stabilizes the multiphase flow line, which makes it possible not only to reduce the effects of slugging, as in the case of conventional methods, but also to entirely avoid slugging.

An advantage of the invention, compared with a conventional control method, is that it stabilizes the multiphase flow throughout the complete flow line. This also means that by applying the invention the production rate, for instance at a production platform, may be increased.

An advantage of the invention is that, compared with conventional methods, it reduces the number of occurrences and formations of slugs in a flow line. In this way the invention enables energy to be used in a more efficient way in the flow line in order to transport a multiphase mixture of oil, gas and water. This in contrast of letting energy out of the system in the form of blowouts as slugs leave the outlet of the flow line, such as the outlet of a riser.

Another advantage of the invention, compared with conventional methods using design changes, is that it does not require new process equipment to be installed. Hence, substantial capital investment is avoided. It is however assumed that there is at least one available pressure or temperature measurement along the flow line upstream the point where the main part of the slug is generated. It is also assumed there is at least one control valve in the flow line.

It is an aim of the invention to supply a method, which applies to a dynamic feedback controller, which is a multi-variable input, single output controller, wherein the method acts upon periodic variations in measured variables.

It is a further aim of the invention to stabilize the multiphase flow at any point of the flow line.

The above mentioned objects and aims are met by the invention including a method for stabilizing a multiphase flow through a flow line where instability of the multiphase flow is caused by at least one slug, including measuring continuously one pressure variable upstream of the point where the main part of the slug is generated, supplying the pressure variable to a dynamic feedback controller, wherein the pressure variable upstream of the slug is an input to the dynamic feedback controller, calculating continuously an output of the dynamic feedback controller, and controlling a control valve at a flow line by means of the output from the dynamic feedback controller, wherein the multiphase flow is stabilized through out the flow line. The above mentioned objects and aims are also met by a computer program product including computer program instructions for carrying out a method according to the present invention.

These and other advantages with the present invention and aspects of it will become apparent from the detailed description and from the accompanying drawings.

BRIEF DESCRIPTION OF THE DRAWINGS

FIG. 8 should be compared with the FIG. 6 where no dynamic feedback control is used and slugging occurs.

DETAILED DESCRIPTION OF THE INVENTION

Figure 1:
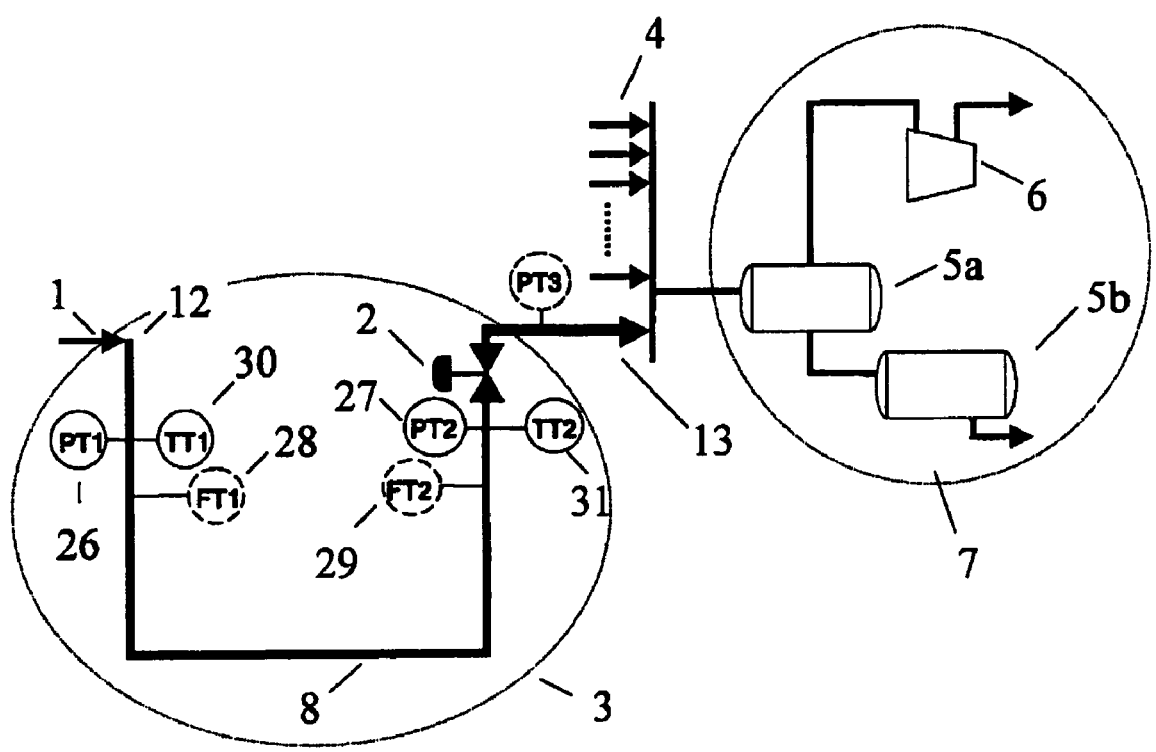
FIG. 1 is a schematic overview of the topology of a flow line, such as a pipeline, between a wellhead platform and a production platform.

FIG. 1 shows a schematic topologic overview of a flow-line control system 3 based on the invention. The figure also shows that as an example the flowline 8a could be a pipeline between a wellhead platform 1 and a production platform 7. Several flow lines 4 may operate in parallel. In the example where the flowline 8a connects to a production platform 7 the platform comprises a compressor 6 and a first 5a and second stage 5b separator.

A method according to the invention for stabilizing a multiphase flow in a flow line 8a, where instability of the multiphase flow is caused by at least one slug 8b, or slugging, comprises the following steps:

measuring continuously one pressure variable 26 upstream the point where the main part of the slug 8b is generated, supplying at least the pressure variable mentioned above to a dynamic feedback controller, calculating continuously an output 11 of the dynamic feedback controller 9, controlling the opening of a control valve 2 at said flow line 8a, wherein the multiphase flow is stabilized through the flow line 8a.

Figure 2A:
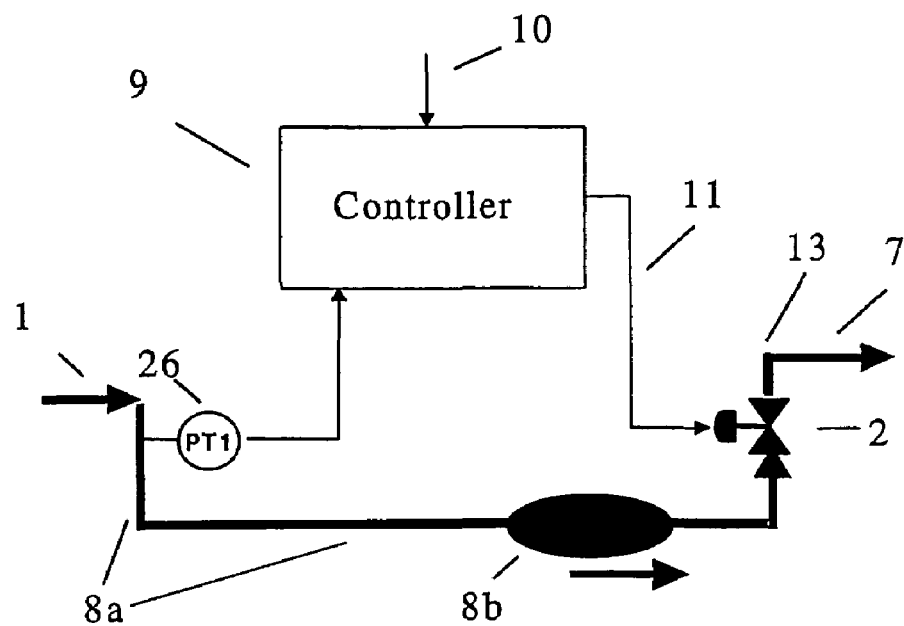
FIG. 2a shows a schematic overview of an implemented control calculation for active feedback control of slug flow through a flow line. Further the figure shows that the measurement of a pressure variable is positioned upstream the position where the main part of a slug is generated. A method according to the invention uses an active feedback controller to close/open a control valve, which control valve is also shown in the figure.

FIG. 2a shows an overview of a dynamic feedback controller 9 for stabilization of a multiphase flow through a flowline such as a pipeline and/or a riser 8a. As an example the flowline connects a wellhead platform 1 and a production platform 7. The multiphase flow comprises liquid and gas. Such an embodiment is not limited to pipelines from wellhead platforms to production platforms, but is applicable to any flow line such as from a subsea manifold. FIG. 2a also shows a schematic image of generation of a slug 8b.

The dynamic feedback controller 9 is implemented in such a way that it stabilizes the flow through the flowline 8a, as indicated in FIG. 2a, by use of a control valve 2, which is automatically controlled.

A method according to the invention uses a pressure variable PT1 26 upstream of any liquid plug. The variable PT1 is a pressure measurement or as an alternative a temperature measurement can be used from which the pressure is calculated. Yet, another alternative to is to calculate the pressure variable on other measurements. As an example one measurement at the flow line inlet and a measurement upstream or down stream the control valve is used as input to calculate/estimate the pressure variable.

Pressure measurements PT1 26 at inlet 12, or at some point upstream of the control valve 2, measuring pressure variations upstream of the liquid plug 8b.

Figure 2B:
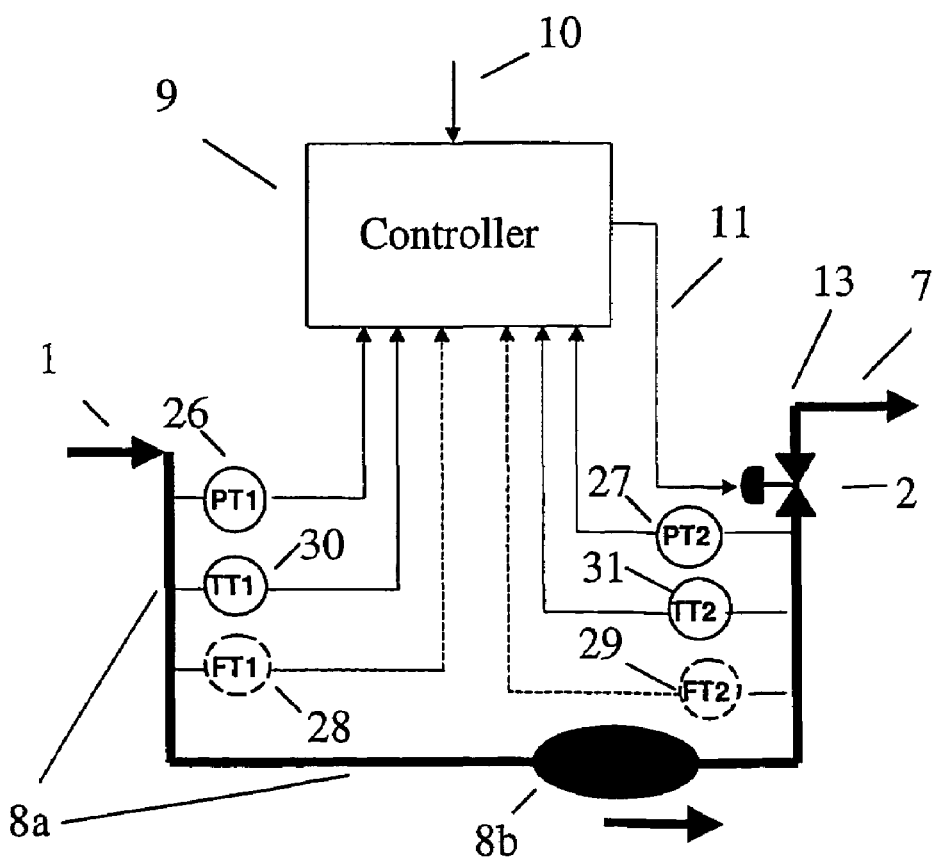
FIG. 2b shows a schematic overview of an alternative embodiment of an implemented control calculation for active feedback control of slug flow through a flow line.

FIG. 2b shows an overview of an alternative dynamic feedback controller 9 for stabilization of a multiphase flow through a pipeline or a riser 8a between a wellhead platform 1 and a production platform 7. Each of the indicated measured variables improves the performance of an embodiment of the invention:

Pressure measurements PT2 27 at the outlet 13, upstream of control valve 2.

Pressure measurements PT3 at the outlet 13, downstream of control valve 2.

Pressure difference across the pipeline 8a, or a part of the pipeline, based on the two measurements PT1 26 and PT2 27.

Flow measurements FT1 28 at the inlet 12, or at some point upstream of the outlet 13, measuring flow variations upstream of the liquid plug 8b.

Flow measurements FT2 29 at the outlet 13, upstream of the control valve 2.

Measurements can be made topside as well as subsea.

Enhanced control can be achieved by including additional measurements (flow, density and temperature). In case flow measurements are included, estimates of flow conditions in the pipeline/riser/well flow line 8a will be improved.

A distinct difference between the dynamic feedback control disclosed by the invention compared with traditional control methods is the use of measurements upstream of the position of the slug formation. Whereas the other methods have a mitigating effect, the dynamic feedback control improves the stability of the pipeline flow and in a much more efficient way reduces the occurrence of slugs. That is achieved at a higher mean flowrate than what is possible with traditional control methods. Further the dynamic feedback controller according to the invention reduces the variation of flow line inlet pressure.

In case of any kind of failure, output 11 will go to a pre-defined value.

The dynamic feedback controller 9 has proved to stabilize the flow both by simulation and also by field tests. The dynamic feedback controller 9 allows stabilization of pipeline variables (pressure, temperature, holdup, and flow), at any point in the pipeline/riser 8a. This means that the controller 9 is not limited to stabilization only at the outlet 13 of the flow line.

In an alternative embodiment of the invention, a calculation for slug detection is used together with dynamic feedback controller. In addition to utilizing the same measurements as the dynamic feedback controller 9, the slug detection calculation also uses the pressure upstream of the control valve as input. The slug detection calculation may utilize a pressure measurement downstream PT3 of the control valve. The output from the slug detection calculation is typically used for information purposes, notifying personnel about an upcoming slug 20–30 minutes in advance. The information is for instance displayed on computer screens in the control room. In one embodiment of the invention the slug detection calculation is used in order to stabilize the multiphase flow even further.

The Dynamic Feedback Controller

The dynamic feedback controller 9 is preferably a multivariable input, single output controller. The dynamic feedback controller is preferably described in a state-space form and implemented in a control program for a control means. A control means comprises at least one out of an industrial controller, a programmable logic computer (PLC), an industrial purpose computer, a general-purpose computer or a purpose built device for stabilization of multiphase flow. A particularly useful and efficient implementation is achieved by using structured text according to the IEC 1131 program language standard. This and other ways of implementation a control program, based on a state-space form is well known to a person skilled in the art.

Figure 3:
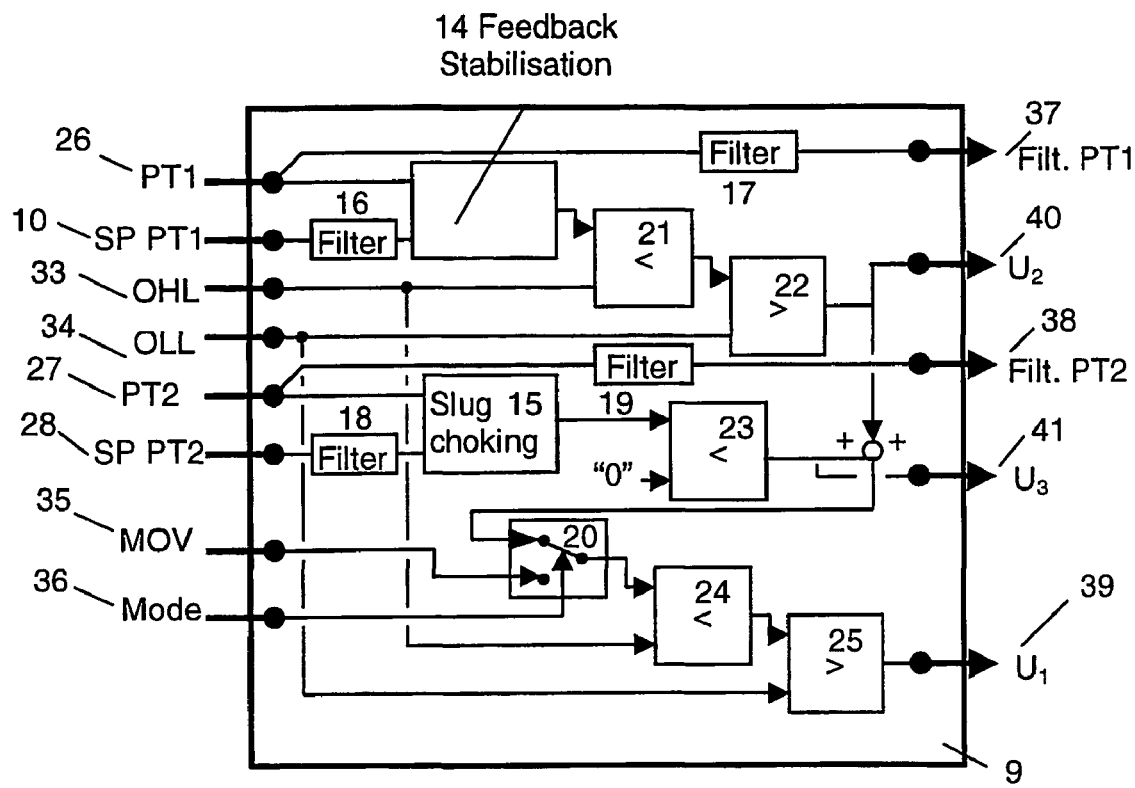
FIG. 3 shows the different blocks involved in an implemented control calculation for active feedback control of a flow line which control calculation is used by a method according to the invention.

FIG. 3 shows the dynamic feedback controller in more detail. The controller consists of the following blocks:

14: Feedback stabilization ensures that the pipeline flow is stabilized.

15: Slug choking throttles the control valve in the presence of a slug (pressure rise upstream of the pipeline choke 2).

16–19: Filters for input signals

20: Manual/auto switch

21–25: Max and min function blocks

The input signals to the dynamic feedback controller are:

PT1: Pressure 26 at the pipeline inlet, 12.

Set point PT1: desired/nominal value (SP PT1) 10 for pressure at pipeline inlet, 12. The operator typically enters the nominal value of the set point PT1. As an alternative a computer program may calculate the set point PT1.

PT2: Pipeline pressure 27 upstream of the choke 2.

Set point PT2: nominal value (SP PT2) 28 for pipeline pressure upstream of the choke, 13.

Output High Limit (OHL): upper limit 33 for the controller output U1 and U2.

Output Low Limit (OLL): lower limit 34 for the controller outputs U1 and U2.

Manual Output Value (MOV): output value 35 from the controller when it is in manual mode.

Mode: operator defined controller mode 36.

The output signals from the dynamic feedback controller shown in FIG. 3 include:

Filtered PT1, filtered pressure measurement one 37.

Filtered PT2, filtered pressure measurement two 38.

U1: Controller output 39 to be wired to the flow line, such as a pipeline, control valve (2).

U2: Controller output 40 based on measurement PT1 26.

U3: Controller output 41 based on measurement PT2 27.

Additional output signals from the controller (not shown in FIG. 3) include:

Filtered set-point for PT1

Filtered nominal value for PT2

Controller state

Controller 'I am alive signal'

Alarm signals from the controller (not shown FIG. 3) include:

High output limit alarm

Low output limit alarm

Read fail alarm

The block diagram in FIG. 3 shows the following interconnections:

1. The feedback U2 40 and U3 41 from the two measurements PT1 and PT2 are calculated independently.

2. The output U2 40 from Feedback stabilization 14 is restricted to be within the upper 21 and lower 22 output limits.

3. The output U3 41 from the slug choking calculation 15 is restricted to be below zero 23.
4. The sum of U2 40 and U3 41 is one of the two inputs to the controller mode switch 20. Depending on the operator-defined controller mode, the output from the switch is either the sum of U2 and U3 or the operator-defined Manual Output Value 35.
5. The output U1 from the controller mode switch 20 is then restricted by the maximum and minimum function blocks to be within the upper 33 and lower 34 output limits.

The next paragraphs describe the feedback stabilization 14, slug choking 15, filters 16–19 and the combination of the blocks into the complete dynamic feedback controller. The description of each part is on three levels. Level one is an overview where the purpose of the block is clarified. Level two is a comprehensive mathematical description of the block, and level three discloses a detailed description of the implementation.

Feedback Stabilization

The inventor has found that a calculation of the feedback stabilization 14 is beneficial in order to stabilize terrain and riser induced slug flow.

Level one. The purpose of the calculation of the feedback stabilization is to achieve control of the pipeline inlet pressure, which is the main contributor to the driving force of the flow through the pipeline or riser. The feedback stabilization 14 acts upon slow periodic variations in the pressure measurement PT1 by including control action at low frequency, e.g. integral action. The feedback stabilization 14 may have built-in logic to prevent anti-windup. The anti-windup scheme is implemented by preserving the old control output in the state of the controller, and by this only a smaller set (subspace) of these states are limited.

Level two. An example of how to calculate feedback stabilization 14 is described by the following difference equation:

$$\Delta u_{2,k} = K(\Delta e_{f,k} + T_s/T_1 e_{f,k} + T_2/T_s \Delta\Delta e_{f,k})$$

where $T_s$ is the sampling time, K, $T_1$ and $T_2$ are tuning parameters, the operator $\Delta$ means $\Delta m_k = m_k - m_{k-1}$ and $e_{f,k}$ is filtered error (set-point minus measurement). The filter to obtain the filtered control error is a first-order filter of the type described below. The feedback stabilization controller is implemented based on a state-space form and the state in the controller has been given special ordering so that integral windup is easily implemented.

Level three. In an embodiment of the invention the calculation of the feedback stabilization 14, is implemented based on the state-space realization:

$$\underbrace{\begin{bmatrix} x_{FS,k+1}(1) \\ x_{FS,k+1}(2) \\ x_{FS,k+1}(3) \\ x_{FS,k+1}(4) \end{bmatrix}}_{x_{FS,k+1}} =$$

$$\underbrace{\begin{bmatrix} 1 & K_p(1 + T_s/T_I + T_d/T_s) & -K_p(1 + 2T_d/T_s) & K_p T_d/T_s \\ 0 & e^{(-T_s/T_f)} & 0 & 0 \\ 0 & 1 & 0 & 0 \\ 0 & 0 & 1 & 0 \end{bmatrix}}_{\Phi_n} \underbrace{\begin{bmatrix} x_{FS,k}(1) \\ x_{FS,k}(2) \\ x_{FS,k}(3) \\ x_{FS,k}(4) \end{bmatrix}}_{x_{FS,k}} +$$

$$\underbrace{\begin{bmatrix} 0 & 0 \\ -(1 - e^{(-T_s/T_f)}) & 1 - e^{(-T_s/T_f)} \\ 0 & 0 \\ 0 & 0 \end{bmatrix}}_{\Gamma_{FS}} \begin{bmatrix} y_k(1) \\ y_k(3) \end{bmatrix}$$

$$u_{k+1}(2) = \underbrace{\begin{bmatrix} 1 & 0 & 0 & 0 \end{bmatrix}}_{C_{FS}} \underbrace{\begin{bmatrix} x_{FS,k+1}(1) \\ x_{FS,k+1}(2) \\ x_{FS,k+1}(3) \\ x_{FS,k+1}(4) \end{bmatrix}}_{x_{FS,k+1}}$$

The first element in the state vector $x_{FS,k}(1)$ contains the previous feedback stabilization controller output. The states $x_{FS,k}(2)$ to $x_{FS,k}(4)$ contain the current and the two previous filtered control errors. The state of the feedback stabilization $x_{FS}$ is updated when the controller is running into the high and low output limits. That is, the non-linear saturation logic functions 21 and 22 interfere with the state of the feedback stabilization calculation. The same kind of interference also appears when the controller is in the manual and the starting mode.

Slug Choking

Level one. The purpose of the slug choking calculation 15 is to throttle the control valve 2 of the flowline in the presence of a slug, i.e. when the slug approaches the outlet of the pipeline or riser. The pressure measurement PT2, upstream of the flowline control valve 2, increases rapidly whenever a liquid plug approaches the point of measurement PT1. The slug-choking calculation 15 therefore uses PT2 as input and acts upon pressure increase in this measurement by choking the control valve 2. By choking the controller is able to reduce the velocity of the liquid plug. Experience from simulation and field-tests shows that moderate use of choking in the presence of the slug has a stabilizing effect.

Level two. On continuous form the slug choking feedback controller 15 has the following form:

$$K(s) = k\frac{s}{(\tau_1 s + 1)(\tau_2 s + 1)}, \quad u_3(s) = K(s)e_2(s)$$

where K(s) is the Laplace transform of the slug choking controller, $u_3$ is the controller output (the control valve opening) and $e_2$ is the filtered nominal value for PT2 minus PT2. Tuning parameters are the frequencies $f_1 = 1/\tau_1$ and $f_2 = 1/\tau_2$, and the controller gain k.

Level three. With sampling time $T_s$ and Zero Order Hold (ZOH) a discrete time state-space description of the controller K(s) is:

$$\underbrace{\begin{bmatrix} x_{sc,k+1}(1) \\ x_{sc,k+1}(2) \end{bmatrix}}_{x_{sc,k+1}} =$$

$$\underbrace{\begin{bmatrix} e^{-T_s/\tau_1} & 0 \\ 0 & e^{-T_s/\tau_{2i}} \end{bmatrix}}_{\Phi_{sc}} \underbrace{\begin{bmatrix} x_{sc,k}(1) \\ x_{sc,k}(2) \end{bmatrix}}_{x_{sc,k}} + \underbrace{\begin{bmatrix} k_p(1 - e^{-T_s/\tau_1}) \\ k_p(1 - e^{-T_s/\tau_2}) \end{bmatrix}}_{\Gamma_{sc}} \underbrace{\begin{pmatrix} y_k(2) - y_k(4) \\ e_k(2) \end{pmatrix}}$$

-continued $$u_{k+1}(3) = \underbrace{\begin{bmatrix} \frac{1}{\tau_2 - \tau_1} & \frac{-1}{\tau_2 - \tau_1} \end{bmatrix}}_{C_{sc}} \underbrace{\begin{bmatrix} x_{sc,k+1}(1) \\ x_{sc,k+1}(2) \end{bmatrix}}_{x_{sc,k+1}}$$

Filters

Level 1. The purpose of the filters 16–19 and the filter inside the feedback stabilization calculation 14, is to filter the error signal to ensure smooth changes in operation point and filtering of high frequency noise.

Level 2. The filters are all first-order low pass filters with unity steady-state gain. The common form of these filters is:

$$F(s) = \frac{1}{T_f s + 1}, \quad y_f(s) = F(s)y(s)$$

Level 3. With sampling time $T_s$ and ZOH, a discrete time state-space description of the continuous filter $F(s)$ is:

$$x_{f,k+1} = \underbrace{e^{-T_s/T_f}}_{\Phi_f} x_{f,k} + \underbrace{(1 - e^{-T_s/T_f})}_{\Gamma_f} y_k, \quad y_{f,k+1} = \underbrace{1}_{C_f} x_{f,k+1}$$

The Full State-space Dynamic Feedback Controller

Level 1. The individual dynamic parts of a dynamic feedback controller are described above. These parts are put together into one state-space description of the dynamic feedback controller.

Level 3. In an embodiment of the invention a state-space an example of representation of the dynamic feedback controller 9 is:

$$x_{k+1} = \Phi x_k + \Gamma y_k, \quad u_{k+1} = C x_{k+1} + D y_k,$$

where
- $x_k$ is the state-space vector of the controller
- $y_k$ is the input vector to the controller (measurements and set points/nominal values etc.)
- $u_k$ is the output vector from the controller The elements in the input vector $y_k$ are:
- $y_k(1)$ pipeline inlet pressure 26, PT1
- $y_k(2)$ pressure upstream the control valve 2, PT2
- $y_k(3)$ set-point 10 for pipeline inlet pressure, PT1
- $y_k(4)$ nominal value for pressure upstream of the control valve 2, PT2

The elements in the state vector $x_k$ are:
- $x_k(1)$ previous control value, i.e. $u_{k-1}(2)$
- $x_k(2)$ filtered control error at time k, i.e. $e_{f,k}$
- $x_k(3)$ filtered control error at time k–1, i.e. $e_{f,k-1}$
- $x_k(4)$ filtered control error at time k–2, i.e. $e_{f,k-2}$
- $x_k(5)$ Filtered PT1
- $x_k(6)$ Filtered PT2
- $x_k(7)$ Filtered set-point to PT1
- $x_k(8)$ Filtered nominal value for PT2
- $x_k(9)$ State one in the slug choking calculation
- $x_k(10)$ State two in the slug choking calculation
- $x_k(11)$ Controller state
  - 0 Manual
  - 1 Starting
  - 2 Auto The elements in the output vector $u_k$ are:
- $u_k(1)$ Output 39 from the dynamic feedback controller
- $u_k(2)$ Output 40 from the feedback stabilization 14
- $u_k(3)$ Output 41 from the slug choking 15
- $u_k(4)$ Filtered pressure measurement 37 PT1
- $u_k(5)$ Filtered pressure measurement 38 PT2
- $u_k(6)$ Filtered set-point 16 for pressure measurement PT1
- $u_k(7)$ Filtered nominal value 18 for pressure measurement PT2

The matrices $\phi, \Gamma, C, D$ are:

$$\Phi = \begin{bmatrix} \Phi_{FS} & 0_{4\times 4} & 0_{4\times 2} & 0_{4\times 1} \\ 0_{4\times 4} & \Phi_{filter} & 0_{4\times 2} & 0_{4\times 1} \\ 0_{2\times 4} & 0_{2\times 4} & \Phi_{sc} & 0_{2\times 1} \\ 0 & 0 & 0_{1\times 2} & 1 \end{bmatrix},$$

$$\Gamma = \begin{bmatrix} \Gamma_{FS} \\ \Gamma_{filter} \\ \Gamma_{sc} \\ 0 \end{bmatrix} \quad C = \begin{bmatrix} 0_{1\times 4} & 0_{1\times 4} & 0_{1\times 2} & 0 \\ C_{FS} & 0_{1\times 4} & 0_{1\times 2} & 0 \\ 0_{1\times 4} & 0_{1\times 4} & C_{sc} & 0 \\ 0_{4\times 4} & I_{4\times 4} & 0_{4\times 2} & 0_{4\times 1} \end{bmatrix},$$

$$D = 0_{7\times 4} \quad \Phi_{filter} = \begin{bmatrix} e^{-T_s/T_1} & 0 & 0 & 0 \\ 0 & e^{-T_s/T_2} & 0 & 0 \\ 0 & 0 & e^{-T_s/T_3} & 0 \\ 0 & 0 & 0 & e^{-T_s/T_4} \end{bmatrix},$$

$$\Gamma_{filter} = \begin{bmatrix} 1 - e^{-T_s/T_1} & 0 & 0 & 0 \\ 0 & 1 - e^{-T_s/T_2} & 0 & 0 \\ 0 & 0 & 1 - e^{-T_s/T_3} & 0 \\ 0 & 0 & 0 & 1 - e^{-T_s/T_4} \end{bmatrix},$$

where $0_{m\times n}$ is a m×n matrix with zeros, T1 to T4 are filter time constants and Ts is the sampling interval.

Fixed Controller Output and State Update

Whenever the controller output is fixed, due to
1. Manual mode
2. Startup mode
3. Low or high saturation the controller state is updated so that it goes smoothly out of the fixed output or the saturation. This is achieved by updating the previous controller output in the feedback stabilization calculation.

Dynamic Feedback Controller Modes and Transitions

Figure 4:
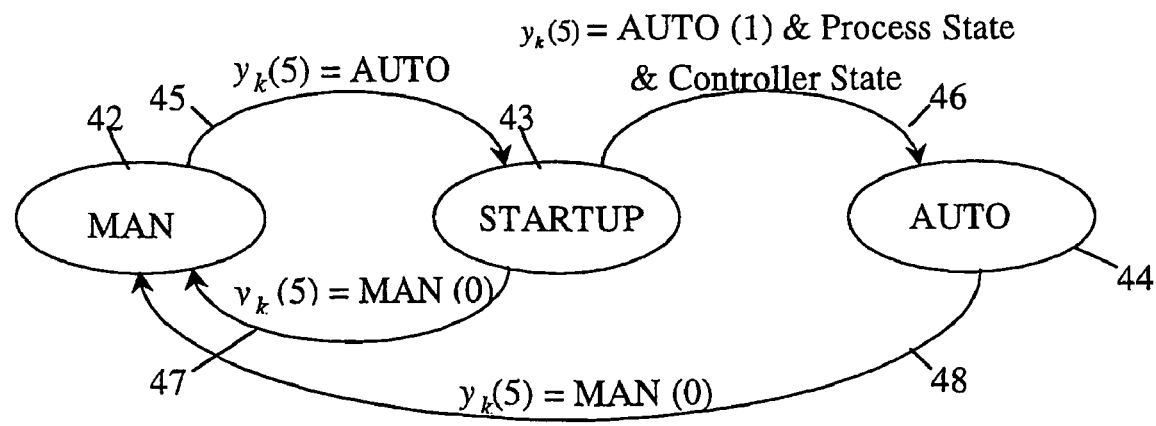
FIG. 4 shows the different controller modes and the transitions between them in an implemented control calculation for active feedback control in order to stabilize a multiphase flow in occurrence of slugs through a flow line.

FIG. 4 shows three different modes. The description below regarding controller modes may be of use when implementing the controller. The three modes are:

1. Manual 42: The controller is running, but the output from the controller to the control valve (2) is kept constant.
2. Startup 43: The controller is running but does not update the output to the control valve (2). It tests for certain process and controller conditions to appear in order to initiate a transition from starting to auto.
3. Auto 44: The controller is running and updates the controller output to the control valve (2).

The operator initiates the transition 45 from Manual 42 to Startup 43 mode by setting the controller mode input 36 to Auto.

The transition 46 from Startup 43 to Auto 44 depends of the process measurements and the calculated output from the controller. The controller will only go from startup to auto if:

1. The controller input mode 36 is in Auto and
2. process measurement PT1 26 is decreasing and
3. the calculated output U1 39 is decreasing.

The Startup mode 43 is included to ensure the best possible condition for flow stabilization.

The transitions from Startup 43 to Manual 42 and from Auto 44 to Manual 42 are initiated by changing the mode input 36 from Auto to Manual.

One alternative when implementing the controller, compared with the description of transitions between modes as described above, is to implement the controller to go directly from Manual to Auto mode.

Controller Startup

Depending on the characteristic of an individual flowline the controller startup should be adjusted to handle specifications and limitations of that flowline. Below is one example of a controller startup. According to the above section "Dynamic feedback controller modes and transitions", as an operator changes the operator-defined mode 36 from Manual (zero) to Auto (one), the controller first goes into a Startup mode 43. In the Startup mode, the controller updates all of its internal states, however the controller output to the control valve 2 remains constant. When certain process and controller conditions are fulfilled the controller starts to update the control valve 2. The reason for the special startup sequence is that it is not possible to stabilize the pipeline flow from an arbitrary pipeline state. As the controller goes from Manual mode to Startup, it initially decreases the opening of the control valve.

Changes in Operating Point

It is advantageous to use filters for changes of the operating point. An operator request to change the operating point, by a change of the set-point/nominal values of the pressure, is filtered by the two filters 16 and 18. The filters are included to ensure smooth transition from one operating point to another.

Controller Operation

The controller set-point 10 variation depends on the mean (typically 2 to 8 hours moving average) pipeline input flow measurement FT1 and/or the mean (typically 1 to 4 hours moving average) control valve opening 2.

The feedback stabilization calculation 14 adjusts the opening of the control valve 2 to achieve the desired pressure (the set-point 10) at the pipe inlet PT1.

The slug choking calculation 15 closes the control valve 2 whenever the pressure measurement PT2 upstream of the control valve 2 increases rapidly. This control action returns to zero over some time (typically a few minutes) whenever PT2 stops increasing or decreasing. The control action in the slug choking 15 and the feedback stabilization 14 act on the control valve at different frequencies by proper adjustment of the tuning factors:

$T_f$ in the feedback stabilization calculation.
$\tau_1$ and $\tau_2$ in the slug choking calculation.

The feedback stabilization calculation 14 acts upon slow to medium periodic variations (typically in the range of 5 minutes to several hours) in the measurement PT1 26 by including control action of low frequency, e.g. integral action. The feedback stabilization 14 has built-in logic to prevent anti-windup. The anti-windup scheme is implemented by giving the controller states a specific ordering, and by this only a smaller set (subspace) of these states are limited.

Pipeline Simulations

Figure 11:
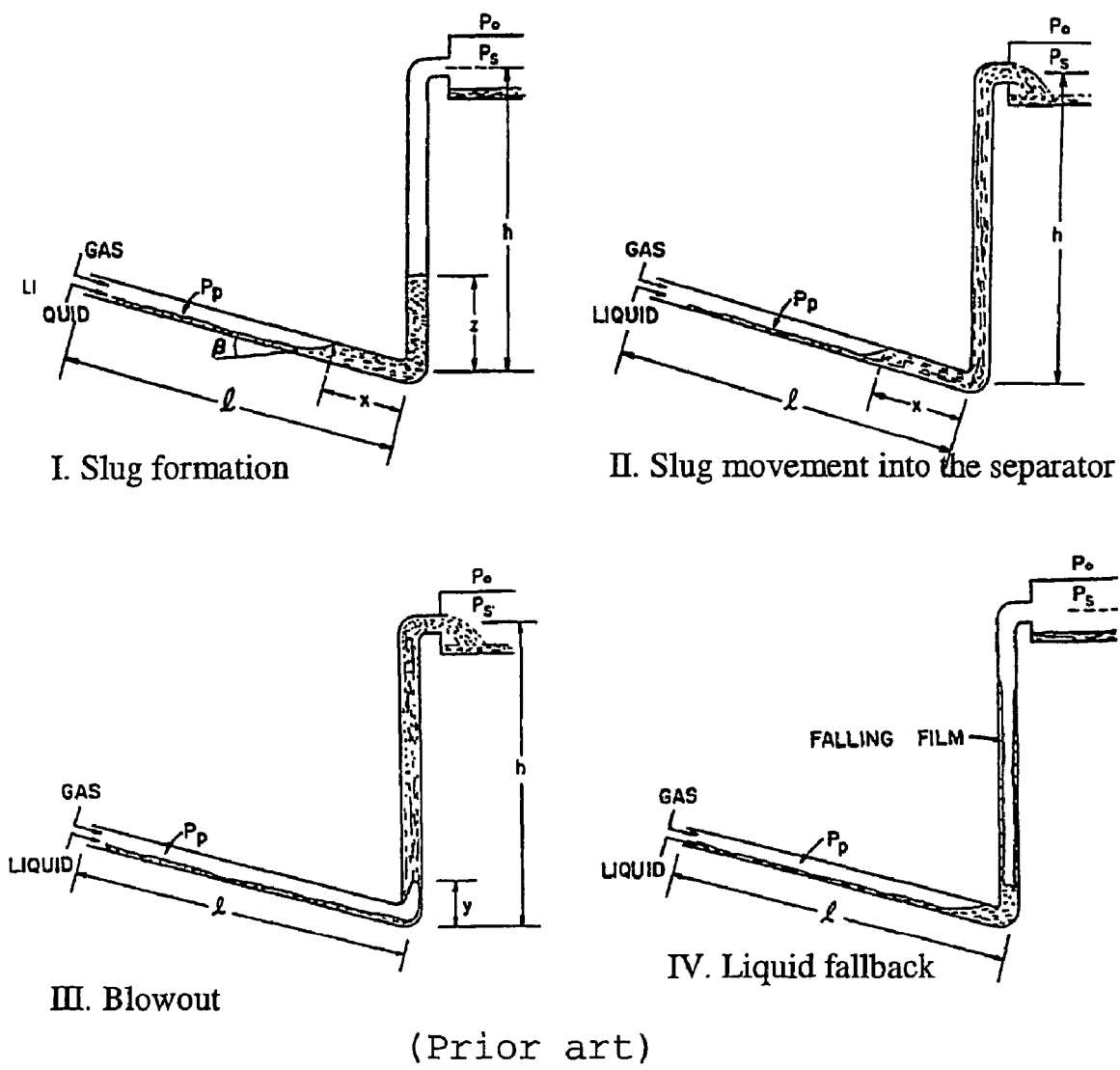
FIG. 11 shows the four stages in a severe slug cycle.

FIG. 11 is included in order to facilitate a better understanding of what a typical slug cycle in a flow line looks like. The details of FIG. 11 are described in the section below.

Figure 5:
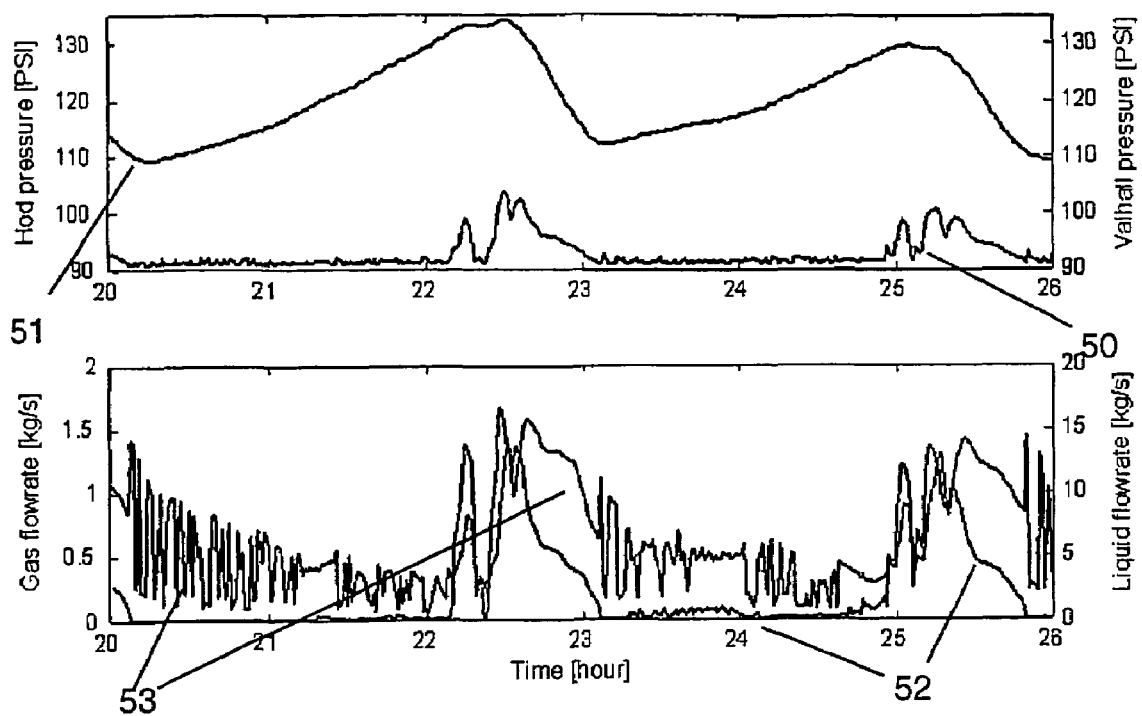
FIG. 5 shows multiphase flow simulations of terrain induced slug flow. The upper part of the figure shows a flow inlet, such as a pipeline inlet, PT1 and outlet PT2 pressure and the lower part shows flow line outlet flow rates. This figure shows that the multiphase flow is unstable in the case of a slugging and prior art technique is used.

Simulations are made by use of the simulation environment OLGA. The models used for simulations are based on fluid mechanics well known to a person skilled in the art. The upper part of FIG. 5 shows the result of multiphase flow simulations of terrain-induced slug flow. The position of the control valve 2 is constant, in other words there is no feedback control applied to the simulations. The lower part of FIG. 5 shows that the liquid flow rate 52 at the pipeline output is zero for a period of about 2 hours. During this time, the pressure upstream of the liquid plug builds up, FIG. 11-I. When the inlet pressure 51 exceeds the hydrostatic pressure of the liquid column in the riser, the liquid accelerates and the outlet pressure 50 rises at the pipe outlet, FIG. 11-II and FIG. 11-III. The liquid is transported to the outlet of the pipe and the pressure decreases as the gas and liquid escape through the pipeline, FIG. 11-IV. The process then repeats itself. The variation in gas flow 53 and liquid flow 52 rate corresponding to the slug flow is shown in the lower part of FIG. 5.

Figure 6:
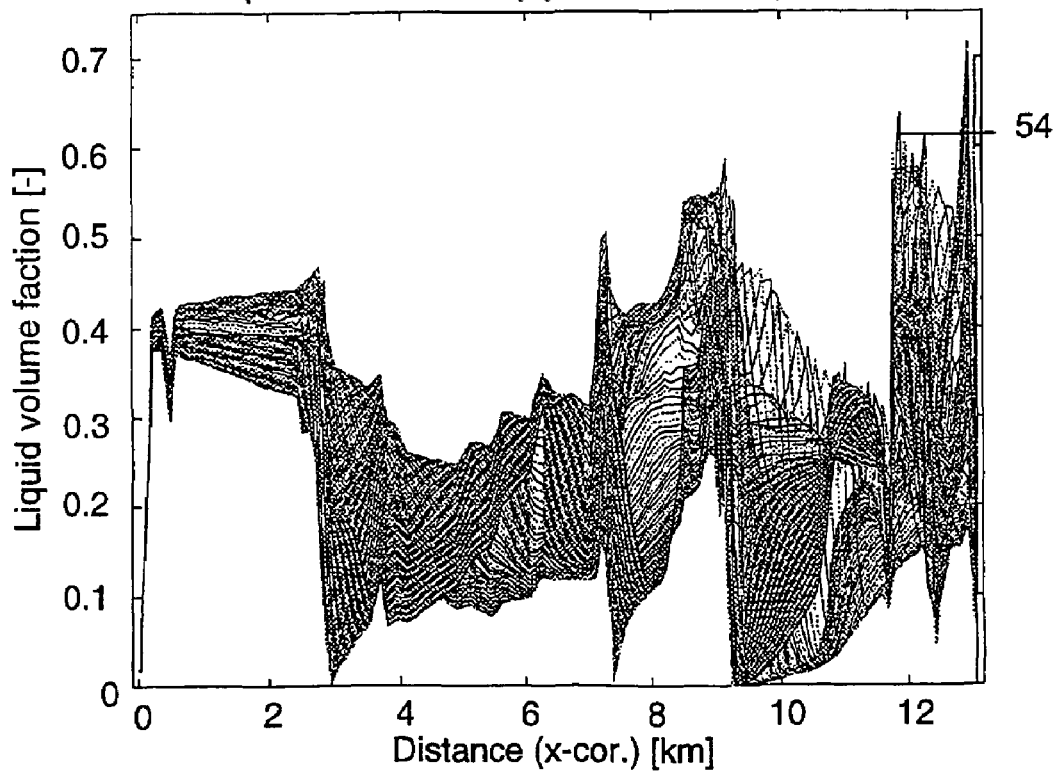
FIG. 6 shows multiphase flow simulations of terrain induced slug flow. Each line represents the pipeline profile plot of liquid volume fraction. The sampling rate is one minute. This figure shows that the multiphase flow is unstable in the case of a slugging and prior art technique is used.

FIG. 6 shows the pipeline profile plot of the liquid volume fraction 54, sampled each minute during one slug cycle. FIG. 6 corresponds to one of the slug cycles in FIG. 5. It is not what happens at different time points that is important here, but what happens at different positions in the pipeline during the cycle. The position in the pipeline is indicated on the x-axis and the corresponding liquid volume fraction is indicated on the y-axis. Positions where the difference between the maximum and the minimum liquid volume fractions are large have the potential to initiate terrain-induced slug flow.

Figure 7:
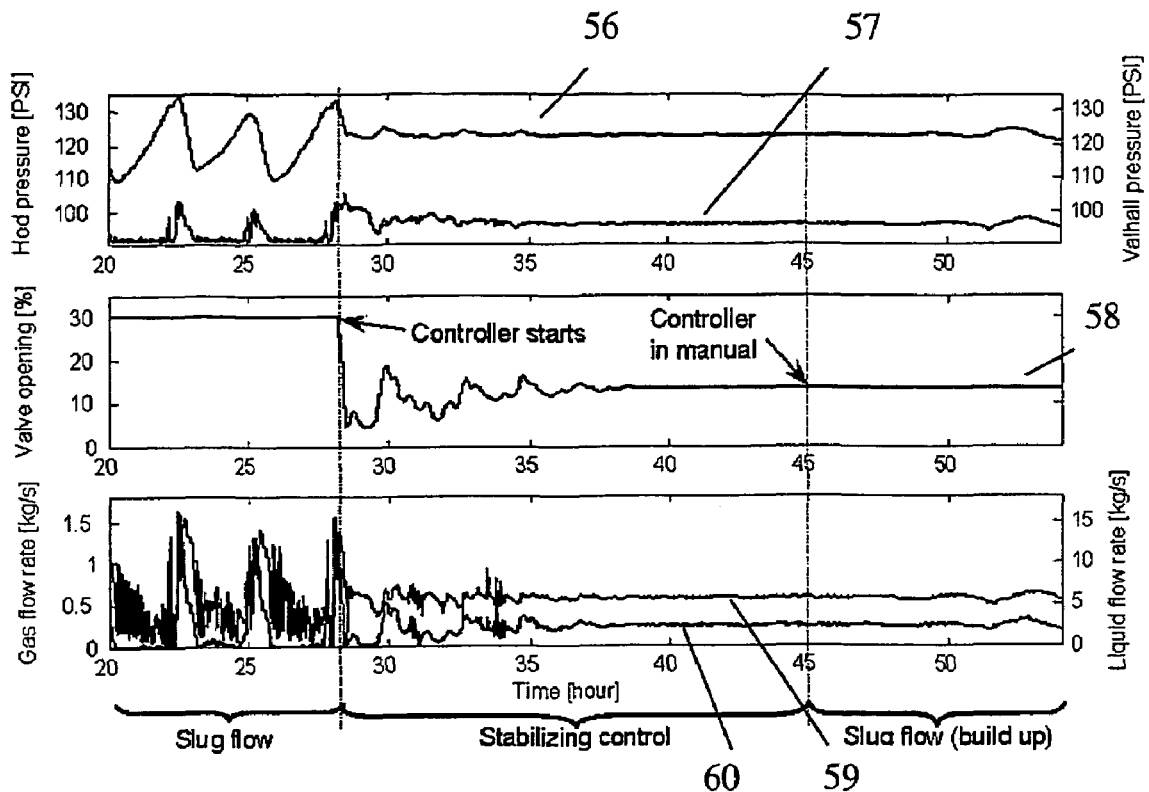
FIG. 7 shows how an active feedback controller based on the invention stabilizes a terrain-induced slug. The upper part of the figure shows pipeline inlet PT1 and outlet PT2 pressure, the lower part shows pipeline outlet flow rates and the middle part shows the controller output U1 to the control valve 2.

FIG. 7 shows the simulated performance of the dynamic feedback controller according to the invention at hand. During the first eight hours the controller is in manual mode and the multiphase flow is unstable as indicated by the characteristic pressure swings in the pipeline inlet pressure 56 and outlet pressure 57. The controller starts at t=28 h and spends the next 5 to 7 hours stabilizing the pipeline. The slugging behavior disappears. From FIG. 7 it may be concluded that the controller has stabilized the multiphase flow and holds the valve opening 58 at a constant output value at t=38 h. However, that the valve opening is held at a constant value is not entirely true. As the controller output 58 is magnified, it becomes clear that the controller constantly makes small movements in the output around its mean value. Those movements controlled by the dynamic feedback controller are necessary to keep the multiphase flow stable. Further in FIG. 7, the controller is set to manual at t=45 h, with its output equal to the mean value of the control valve opening over the previous 3 hours. It is seen from FIG. 7 that with the controller set back to manual the multiphase flow once again becomes unstable. However, the transition into an unstable multiphase flow is slow. Still, FIG. 7 shows that with the dynamic feedback controller turned off the slug flow once again builds up. This despite of that the output of the controller, which sets the control valve opening 58, seemed to be at an optimum level. To stabilize the multiphase flow, at the indicated gas and liquid flow rates, the dynamic feedback controller according to the invention is needed.

From FIG. 7 it seems reasonable to assume that the complete flowline is stabilized as the dynamic feedback controller is started. This since the input pressure 56 and at the output pressure 57 are stabilized. However, due to the length of the pipeline, it could be claimed that internal instability might occur in it.

Figure 8:
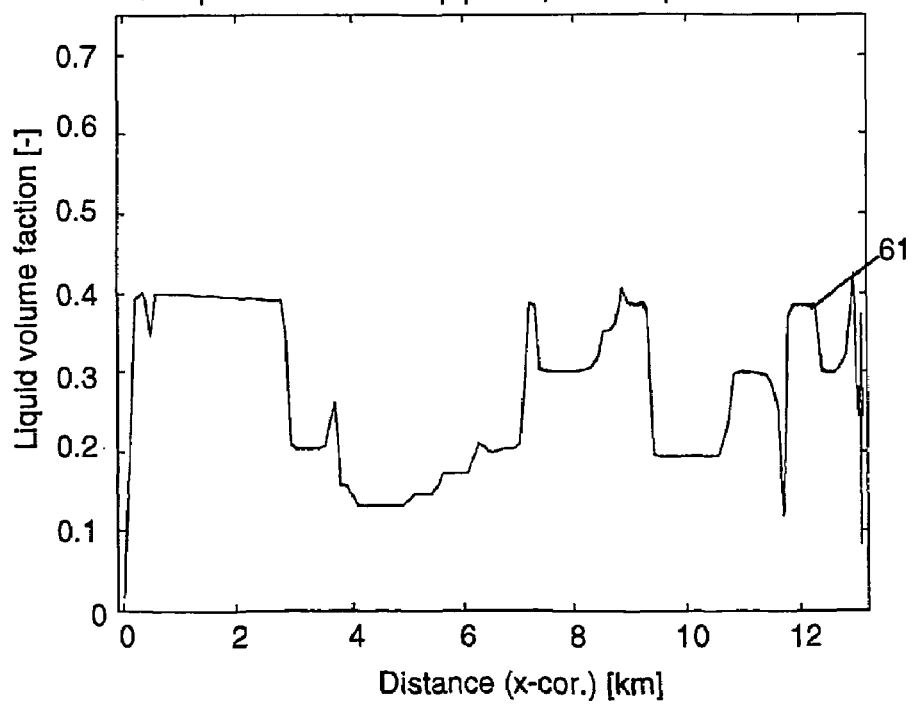
FIG. 8 shows the effect on flow stability by applying an active feedback controller according to the invention on the same flow line and same case as in FIG. 7. There are 240 plots in the figure, which represent the liquid volume fraction but they appear as one.

FIG. 8 shows the profile plots of the resulting liquid volume fraction for the same case as in FIG. 7. The profile plots of FIG. 8 corresponds to the time period from t=41 to 45 h, i.e., which is part of the period in FIG. 7 where the multiphase flow is stabilized. The profile plots of the liquid volume fraction are sampled at 60-second intervals. The number of profile plots of the liquid volume fraction are 240, all lying on top of each other. In this context, stabilization of the multiphase flow is defined by the liquid volume fraction at any point of the flow line showing less than 5% variation around its mean value. The mean value is calculated based on measurements taken during a time interval, where a time interval corresponds to the time of at least one complete slug cycle in the flow line without applying control. Indeed, FIG. 8 shows that the multiphase flow in the pipeline is stabilized according to this definition, and not only in one single point but also through the complete flow line. FIG. 8 should be compared with FIG. 6 where no dynamic feedback control is used. In contrast to FIG. 8, FIG. 6 shows large variations in the liquid volume fraction. When comparing the two figures it is clear that in this case the dynamic feedback controller clearly stabilizes the multiphase flow throughout the flowline.

Riser Simulations

Figure 12:
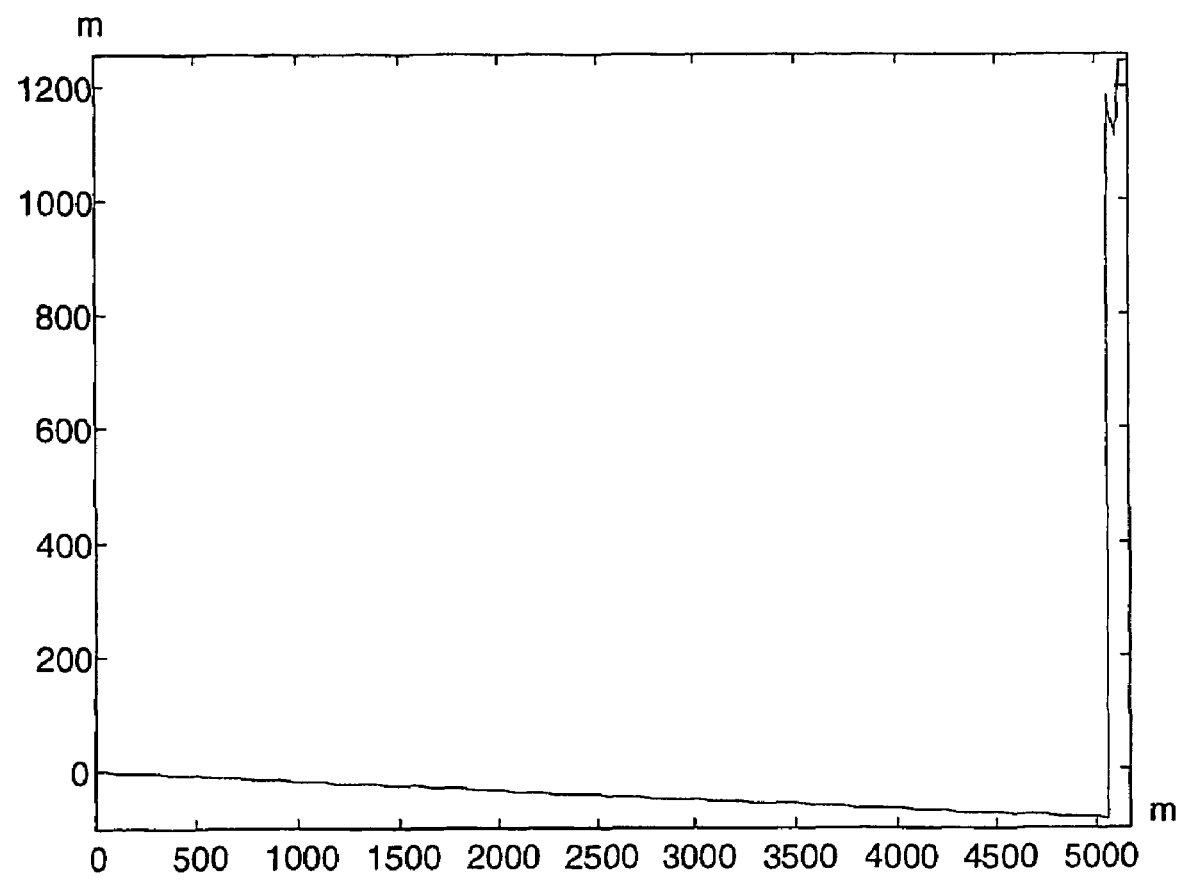
FIG. 12 shows pipeline profile for deep-water riser example.

This section presents results from a deep-water pipeline-riser system, which is simulated by use of the simulation environment OLGA. FIG. 12 shows the pipeline geometry. The total length is approximately 6500 m with a 5000 m flow-line on the seabed and a 1500 m long riser. The inclination from the wellhead to the riser base is 1° downward slope. The sea depth at riser base is 1320 m. A source is located at the inlet of the pipeline. The boundary conditions at the inlet are closed and at the outlet the pressure is set equal to 15 Bar. A control valve is located at the top of the riser. This control valve will be used to control the multiphase flow in the riser.

Two different inlet condition cases are simulated. The first case is at the start of the production profile. The input flow rate is in case one set to 6000 $Sm^3/d$ and the gas fraction is read from the PVT table with the pressure and temperature in the inflow section (the first section in the pipeline) as input to the table. This means that the gas fraction and thereby also the Gas Oil Ratio GOR may vary to some degree. The GOR varies around 125 $Sm^3/Sm^3$. In the second case the GOR is set equal to 250 $Sm^3/Sm^3$ and the flow rate is set equal to 2000 $Sm^3/d$. In both case one and case two the water cut is zero, hence two-phase simulations are considered.

Case One—Using a Traditional Control Method

FIG. 13 to FIG. 16 show simulations of riser-induced slug flow (severe slugging) with an input flow rate of 6000 $Sm^3/d$ with GOR around 125 $Sm^3/Sm^3$. The simulation is applied on the flowline with the profile according to FIG. 12.

Figure 13:
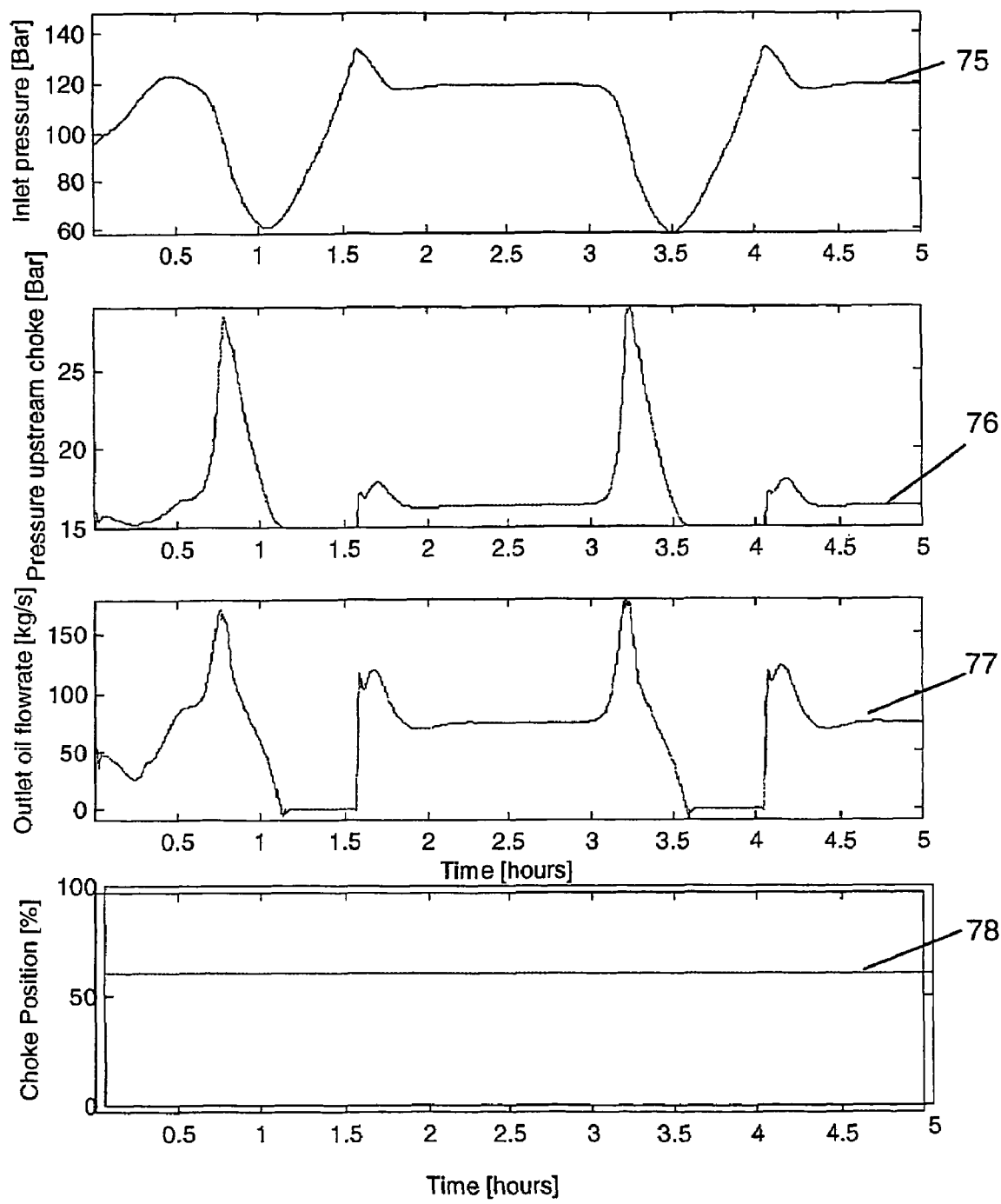
FIG. 13 shows a severe riser induced slug flow cycle in a deep-water riser. This figure shows that the multiphase flow is unstable in the case of a slugging and prior art technique is used.

FIG. 13 shows a severe riser induced slug cycle. It is worth to note the following:
1. The substantial variations in the pipeline inlet pressure 75 and outlet pressure 76.
2. The outlet oil flow rate 77 is nonzero for a large portion of the time as opposed to terrain-induced slug flow. The reason is that the liquid plug extends far into the nearly horizontal pipeline before the riser and it takes some time to produce the liquid in the pipeline, cf. FIG. 11-II.
3. The simulations show a considerable amount of flashing, which gives rise to a gas-lift effect. The gas-lift effect gives a rapid increase in the outlet oil flow rate 77 observed as the first peak in the slug flow cycle. The latter peak in the outlet oil flow rate 77 is related to the blow-out of the riser, i.e., emptying the riser, cf. FIG. 11-III.

Figure 14:
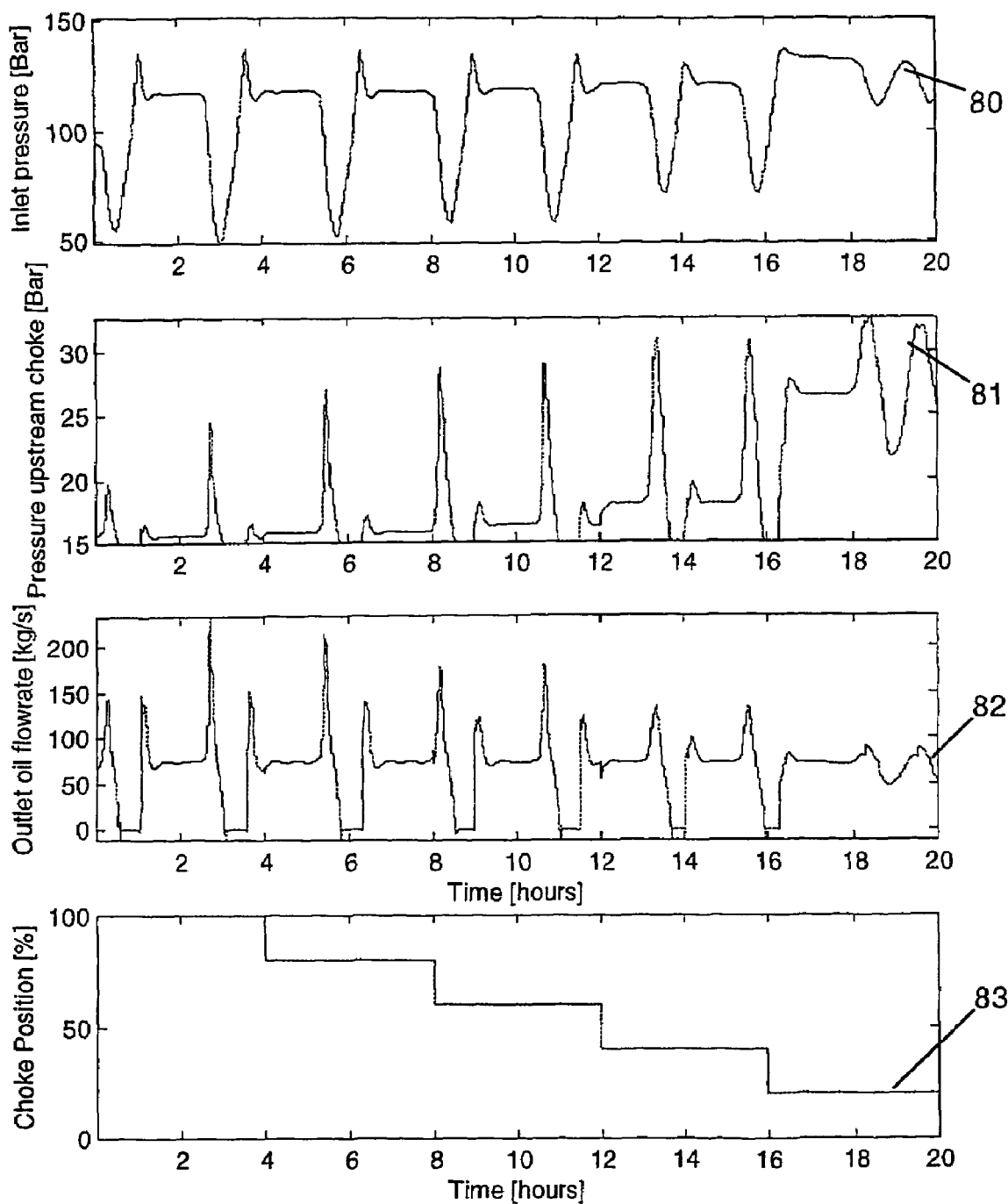
FIG. 14 shows the effect of choking of severe riser induced slug flow. This figure shows that the multiphase flow is unstable in the case of a slugging and prior art technique is used.
Figure 15:
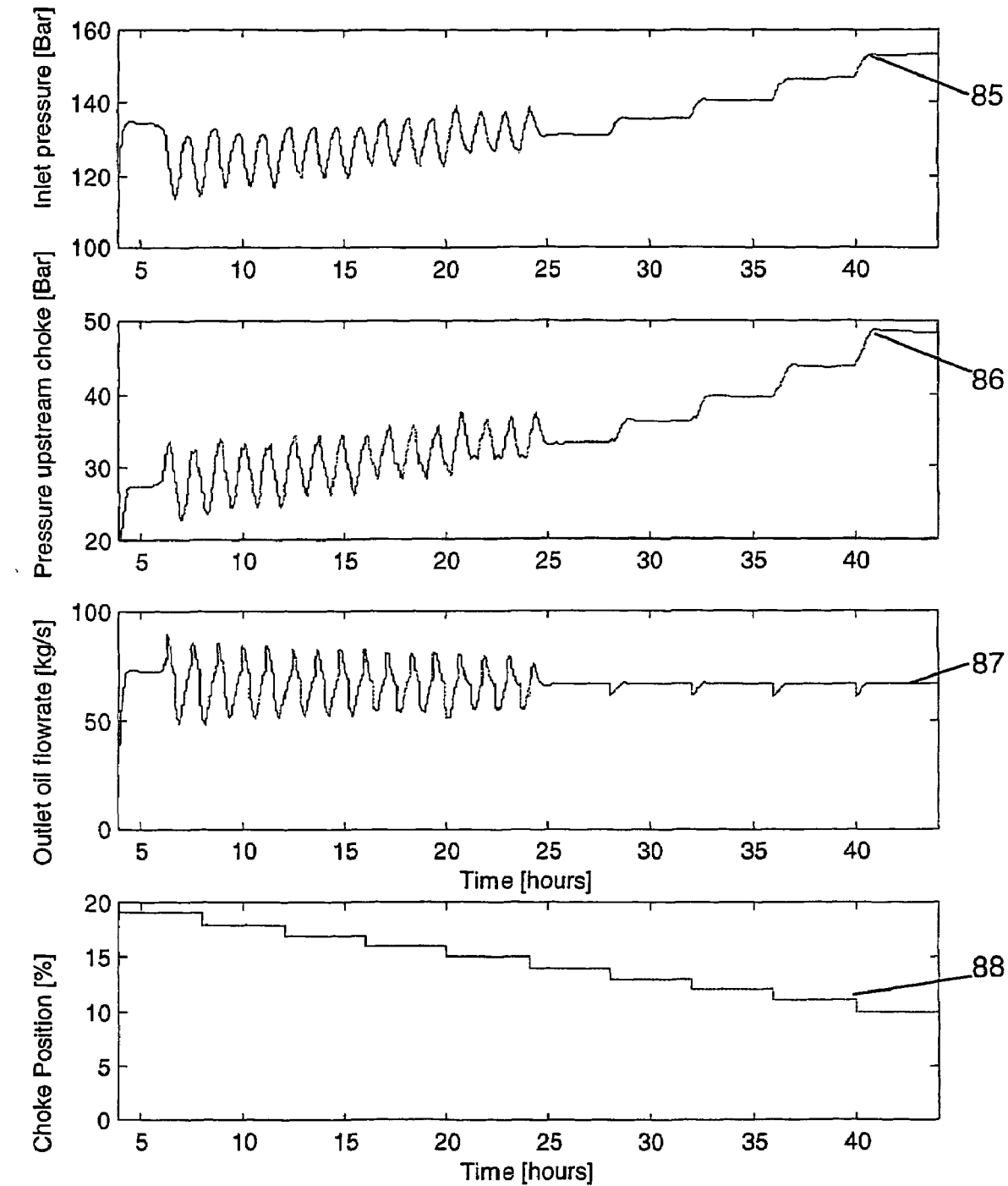
FIG. 15 shows the effect of choking of severe riser induced slug flow. This figure shows that the multiphase flow is unstable in the case of a slugging and prior art technique is used. Chocking the control valve has a mitigating effect on slugging, but the flow is not stabilized.

FIGS. 14 and 15 show the effect of a stepwise closing of the control valve from 100% to 20%. It should be noted that:
1. In order to get out of the region with unstable riser induced slug flow and to some level stabilize the outlet flow rate 82 and the outlet flow rate 87, it is seen that the control valve 2, according to the plotted control valve position 83 and 88, needs to be closed more than 20%.
2. In order to reduce the peak in the outlet oil flow rate significantly by constant choking, the valve needs to be closed more than 40%.

FIG. 15 shows that the control valve needs to be closed as much as 14% to achieve stable out let flow conditions by choking a pipeline inlet pressure of approximately 135 bar.

Figure 16:
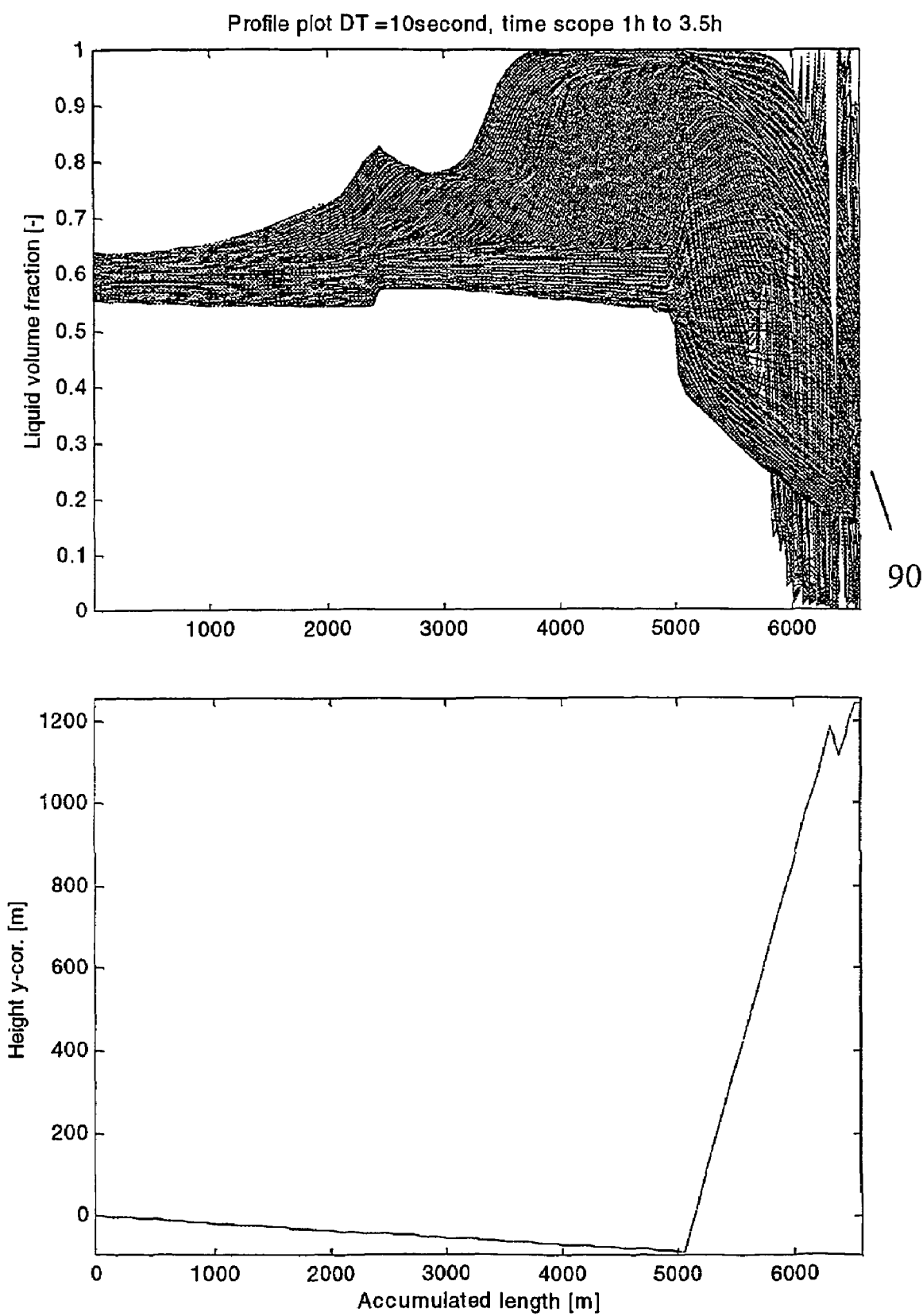
FIG. 16 shows pipeline profile plots of liquid volume fraction through a severe riser induced slug flow cycle.

FIG. 16 shows profile plots of liquid volume fraction through one slug flow cycle. The shaded area corresponds to 900 lines laid on top of each other. There are 10 seconds between each line. The profile plots illustrate the span-in the amount of liquid in different parts of the pipeline. The following conclusions can be made:
1. The liquid plug covers a distance of 1300 m upstream of the riser base.
2. The liquid volume fraction in the local maximum point in the S-shaped riser is never larger than 50%.

Case One—Active Dynamic Feedback Control

Figure 19:
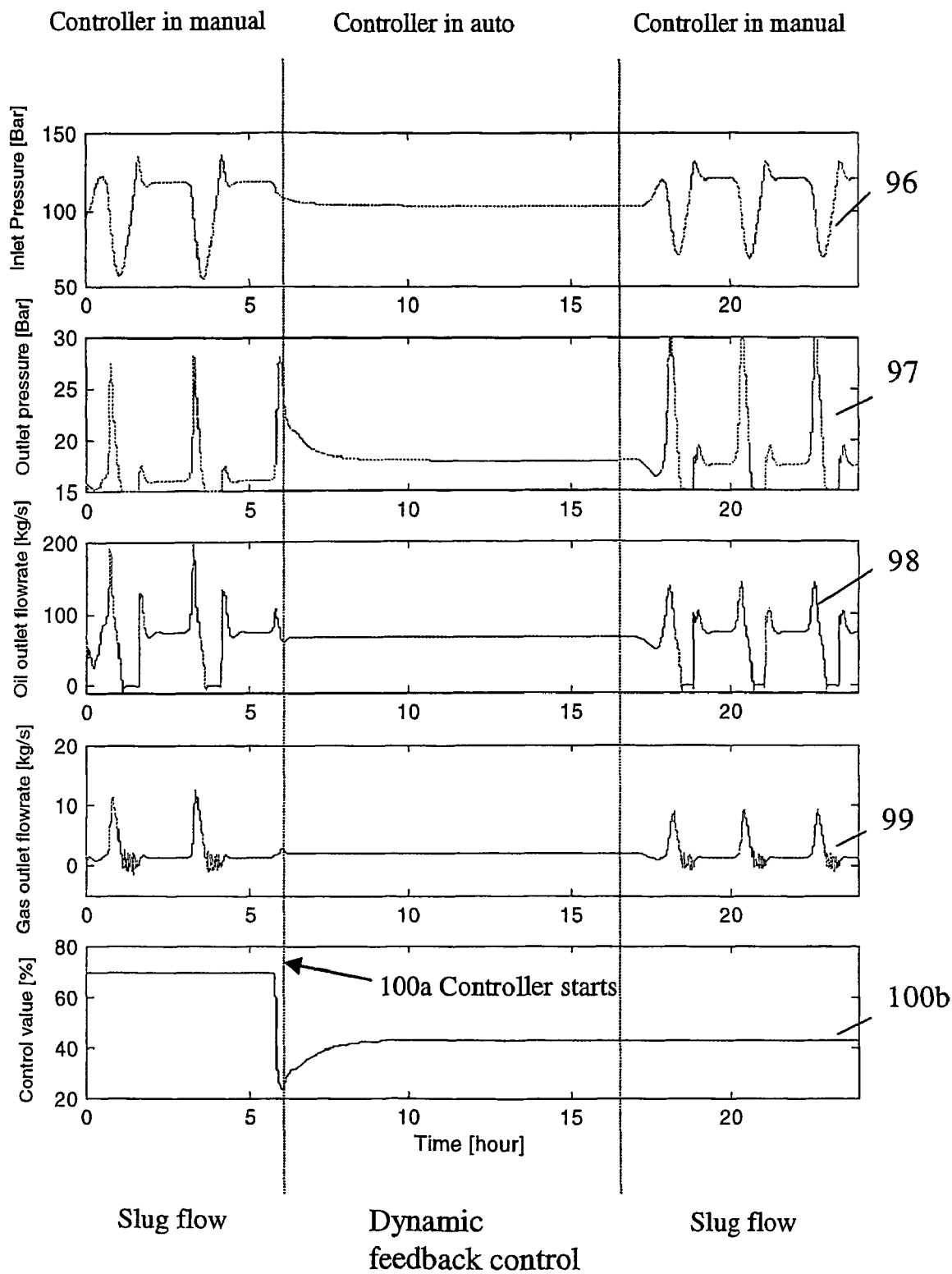
FIG. 19 shows how a multiphase flow during startup, operation and controller stop of a deep-water riser. This as a method based on the invention is applied using a dynamic feedback controller.
Figure 20:
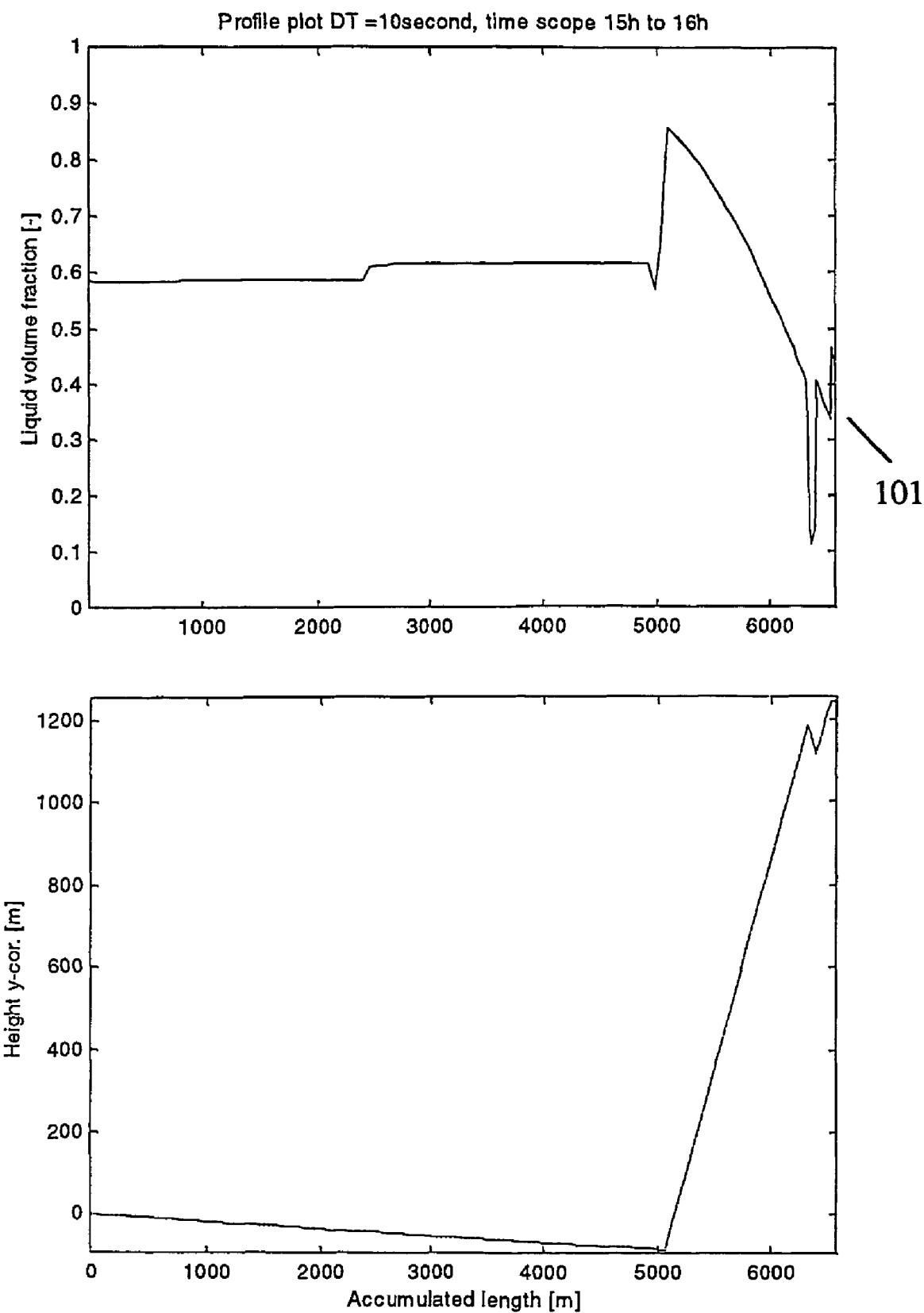
FIG. 20 (upper part) shows pipeline profile plots of liquid volume fraction with an active feedback controller according to the invention in operation. The figure (lower part) also shows the height of the flow line.

FIGS. 19 and 20 show active dynamic feedback control according to the invention, which is applied to remove the occurrence of slugging in the multiphase flow in the pipeline. Initially, the controller is in manual mode with a control valve opening of 70%. Then, at time t=5 h 100a, the dynamic feedback controller is activated. The controller waits for the best startup condition to occur. This condition occurs at approximately time t=6 h and at this point the controller starts updating the output (control valve). During dynamic feedback control based on the invention the gas flow 99 and oil flow 98 is stabilized, and from FIG. 19 the controller eventually seems to reach a constant output 100b of about 43%. However, with a higher resolution of the plotted trend, it becomes clear that the controller constantly makes small movements (varying in the range of 43.1–43.2%) around its mean value. The small movements in the control valve position are necessary to keep the flow stable.

Further FIG. 19 shows that at time t=16 hours the controller input mode is set back to manual mode with its previous output (43%) as the manual output value. With the controller in manual mode and with the control valve in what seems to be the most optimum position the riser induced slug flow again builds up. No other changes are made. Slug flow with approximately the same control valve opening (40%) is also predicted from the simulations without control. FIG. 19 shows that the invention results in a far better stabilization of multiphase flow compared with a prior art technique.

FIG. 19 also shows that the inlet pressure with the controller in operation is lower (103 Bar), than the case without control, but with maximum opening of the choke and at the same time stable flow (136 Bar). This is an observation made also in other simulated cases.

FIG. 19 further shows the following important points:

Less pressure drop over pipeline with active feedback control than the mean pressure drop with traditional control (this also applies to terrain induced slug flow).

Increased pressure upstream of the control valve with active feedback control results in larger pressure drop over the control valve. This is necessary to have an effect of the movements in the control valve.

With active feedback control, liquid plugs do not occur, only minor movements in the profile plot of liquid volume fraction can be observed during control.

FIG. 20 shows a profile plot of liquid volume fractions during slug control. The plot shows the corresponding plot area of 360 profile plots, 10 seconds apart. They all lie on top of each other, implying that the pipeline indeed is stable.

It is important to note that field tests where the innovation is applied show the same advantages and similar effects compared with traditional control methods as in a simulated environment.

Case Two—Using a Traditional Control Method

The deep-water riser in case two has an input flow rate of 2000 $Sm^3/d$ and a GOR of 250 $Sm^3/Sm^3$. The higher GOR compared to case one means that this case is related to a lighter fluid with more gas and less oil.

Figure 17:
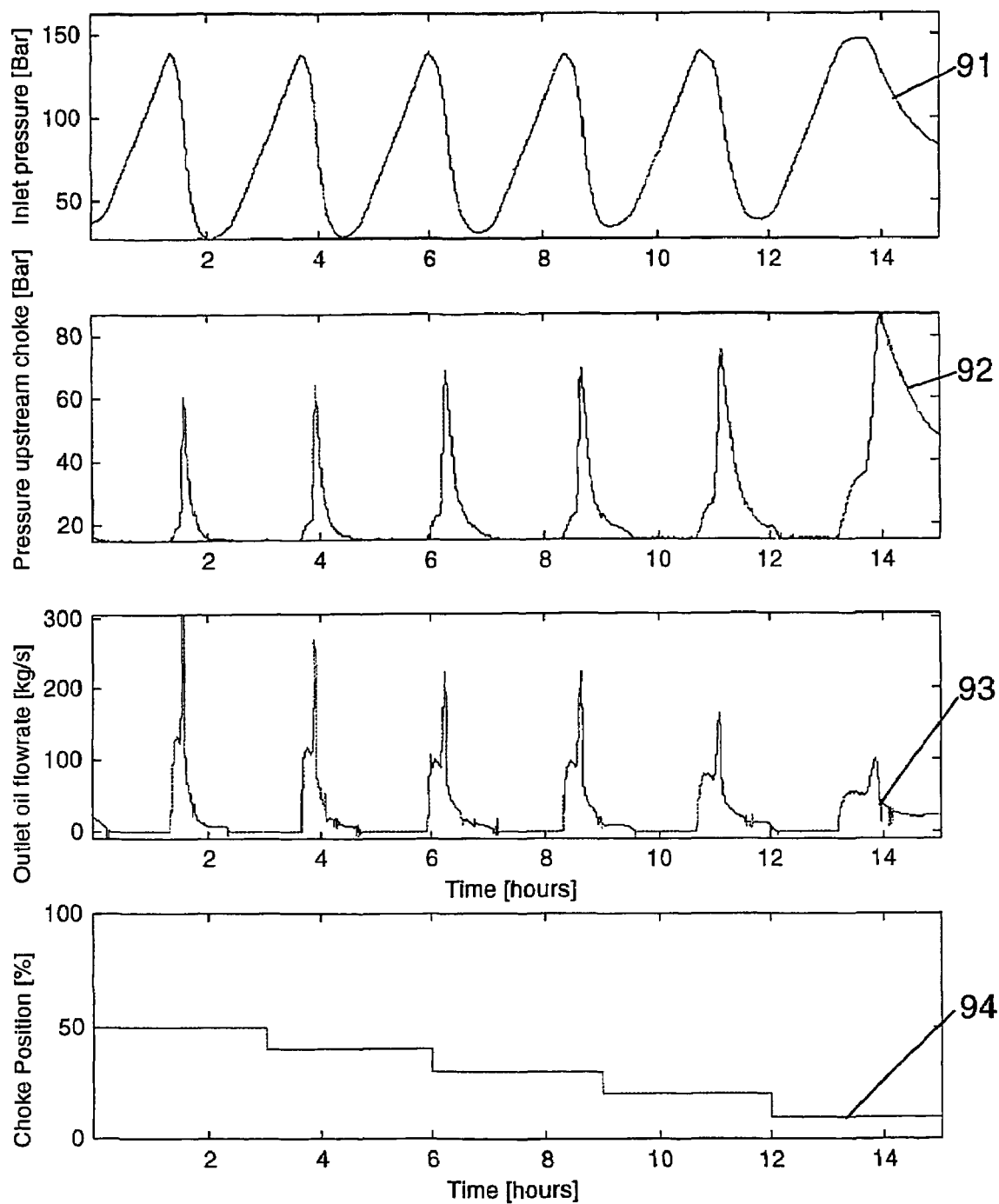
FIG. 17 shows the effect of choking of severe riser induced slug flow.

FIG. 17 shows the effect of stepwise closing of the pipeline control valve from 50% to 20%. Further FIG. 17 shows that:

1. The characteristics of the riser induced slug cycles are different from case one. From FIG. 17, it is seen that the flashing blowout is small, almost missing in this case. The mass transportation period with constant outlet flow rate is also missing. However, still large oscillations in the inlet and outlet pressure appear, which is similar to case one using a traditional control method.
2. The liquid flow rate is zero for a larger portion of the time.

The slug cycles in this case compared to case one are much more similar to terrain induced slug flow. FIG. 17 shows that the control valve needs to be closed as much as 10% to achieve stable flow conditions by choking with a pipeline inlet pressure of approximately 65 bar. The reason for the lower pipeline inlet pressure in this case is the larger GOR.

Figure 18:
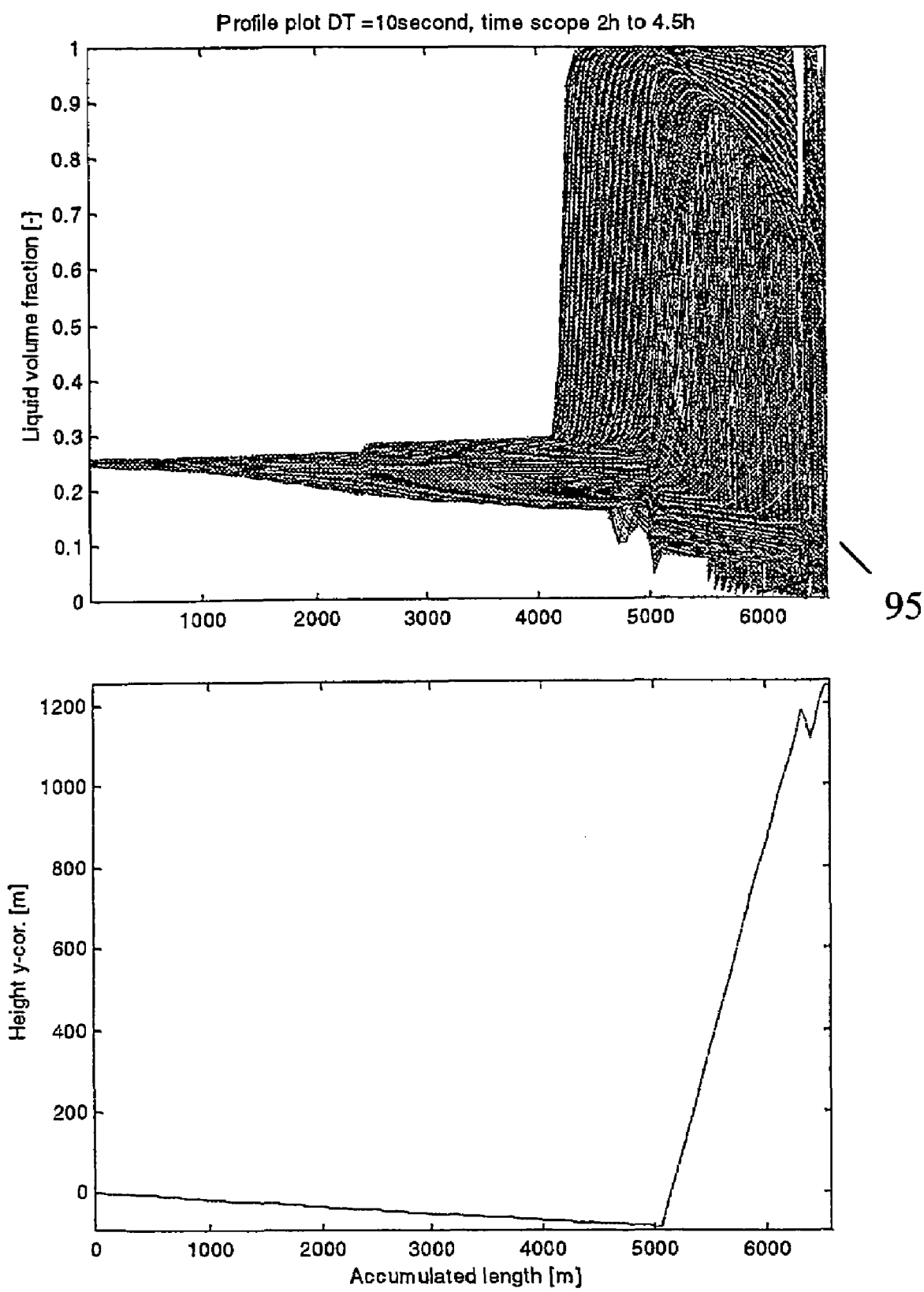
FIG. 18 (upper part) shows pipeline profile plots of liquid volume fraction through a severe riser induced slug flow cycle. The figure (lower part) also shows the height of the flow line.

FIG. 18 shows profile plots (900 lines) of liquid volume fraction through one slug flow cycle. The profile plots are 10 seconds apart. The profile plots illustrate the span in the amount of liquid in different parts of the pipeline. FIG. 18 indicates that:

1) The liquid plug covers a distance of 7000 meter upstream the riser base.
2) The liquid volume fraction in local maximum point in the S-shaped riser does not exceed 70%.

By comparing FIG. 18 of case two with FIG. 16 of case one, it is found that the slug does not extend to the same extent into the horizontal part of the pipeline for case two as it did for case one.

Case Two—Using Active Feedback Control

Figure 21:
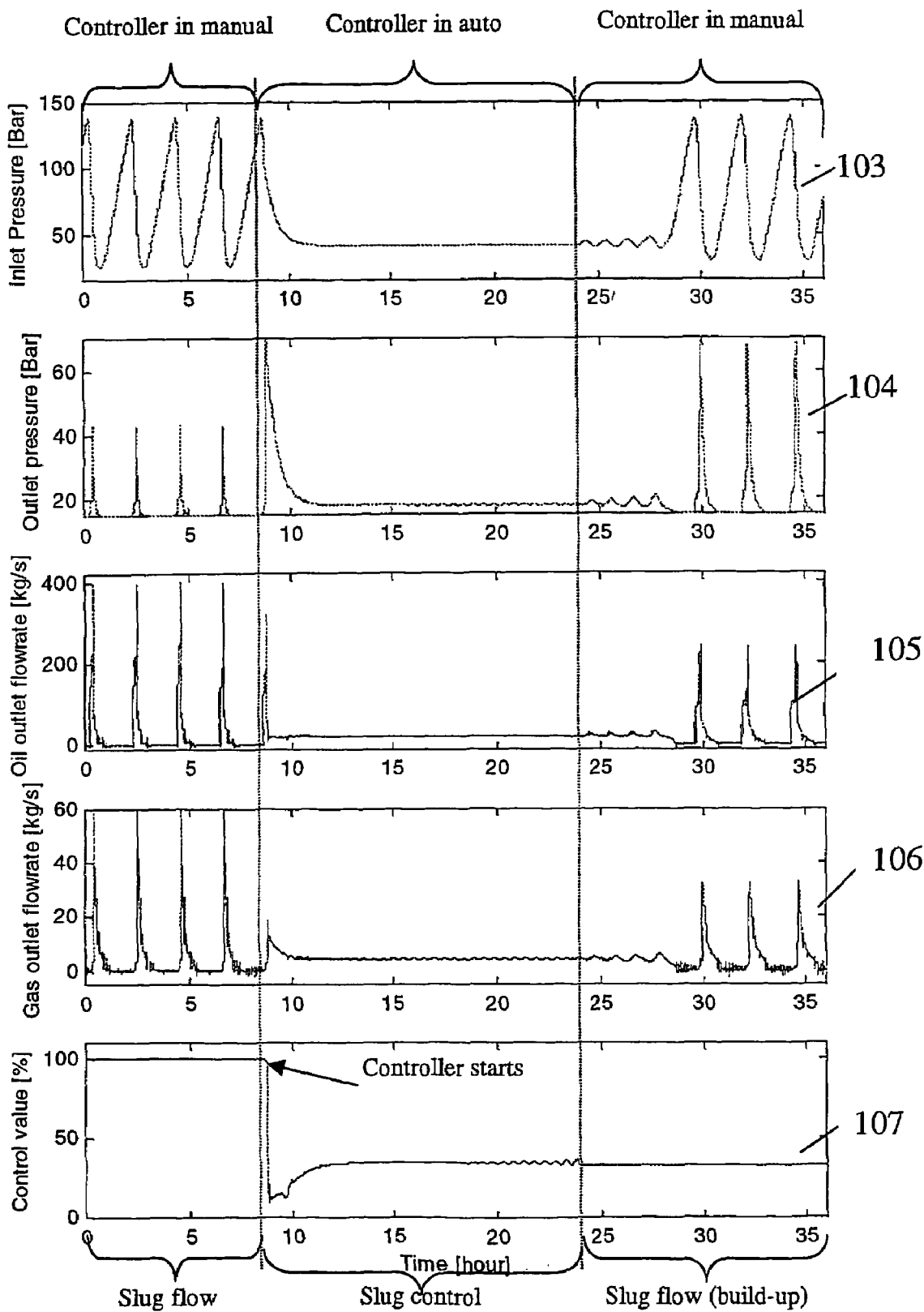
FIG. 21 shows a dynamic feedback controller startup, operation and controller stop of a deep-water riser.
Figure 22:
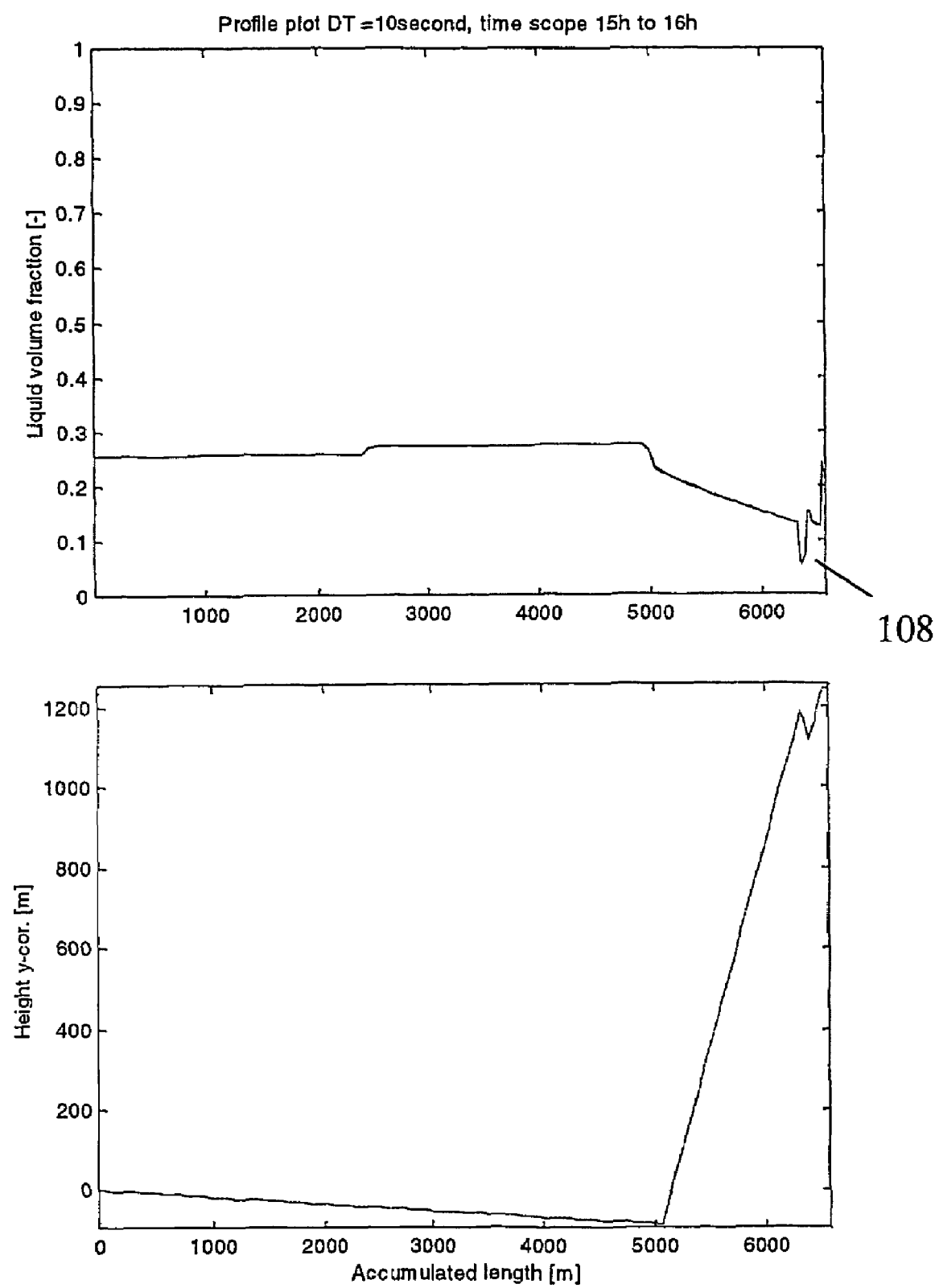
FIG. 22 shows pipeline profile plots of liquid volume fraction with a dynamic feedback controller according to the invention in operation (upper part of figure).

FIGS. 21 and 22 show active feedback control of case two, with an input flow rate of 2000 $Sm^3/d$ and GOR 250 $Sm^3/Sm^3$.

FIG. 21 shows that initially the controller is in manual mode with a control valve opening of 100%. Then, at time t=8 h the active feedback controller is activated. The controller waits for the best startup condition to occur. This condition occurs at approximately time t=8.5 h, at which point the controller starts updating the output (control valve). During slug control the flow is stabilized, and again, from FIG. 21 the controller seems to reach a constant output of about 34.5%. However, if the controller output is magnified, it becomes clear that the controller constantly makes small movements (varying in the range from 34 to 35%) around its mean value. Also in this case the small movements in the control valve position are necessary to keep the flow stable. This is proved by, at time t=24 hours, setting the controller input mode at manual with its previous output (32.5%) as the manual output value. With the controller in manual and with the control valve in this position the riser induced slug flow again builds up. Again, no other changes are made. Slug flow with approximately the same control valve opening (30%) is also predicted from the simulations without control, FIG. 17.

It should again be noted that the inlet pressure with the controller in operation is lower (41 Bar), than the case without control, but with maximum opening of the control valve (10%) and at the same time stable flow (65 Bar).

Further FIG. 21 shows the following effects and advantages by applying active feedback control according to the invention:

1. There is less pressure drop over the pipeline with control compared with the mean pressure drop using a traditional control method.
2. The pressure increases upstream of the choke with control, which results in larger pressure drop over the control valve. This is necessary to have an effect of the movements in the control valve.
3. When applying the invention on the flow line, no liquid plugs occur. Only minor movements in the profile plot of liquid volume fraction can be observed during control.

FIG. 22 shows a profile plot of liquid volume fractions during slug control. The plot includes 360 profile lines, again 10 seconds apart. They all lie on top of each other, implying that the pipeline is stable. By comparing FIG. 22 with FIG. 20, it is found that there is much less liquid preserved in the riser for case two than for case one. This is also the reason for the lower inlet pressures.

If the peaks of flow rate in FIG. 19 are compared with the peaks of flow rate in FIG. 21, it is clear that the peaks are larger for case two than for case one. We noted in the sections presenting the simulations without control that the peaks in the flow rates are much larger for case two than for Case one. In addition, the fraction of time in which the output flow rate is zero is greater for Case two. However, which of these two that represents the largest and most troublesome problem for the downstream production plant is not clear and depends on the plant configuration. It should be clear though that there are several benefits with applying the invention in both cases. In the latter case it is interesting to observe how much the pipeline inlet pressure is reduced compared to pressure variations in slug flow. This pressure reduction represents increased production rate from the wells due to a lower backpressure.

EXAMPLE OF OPERATION IN THE FIELD, OFF-SHORE PIPELINE

Figure 9:
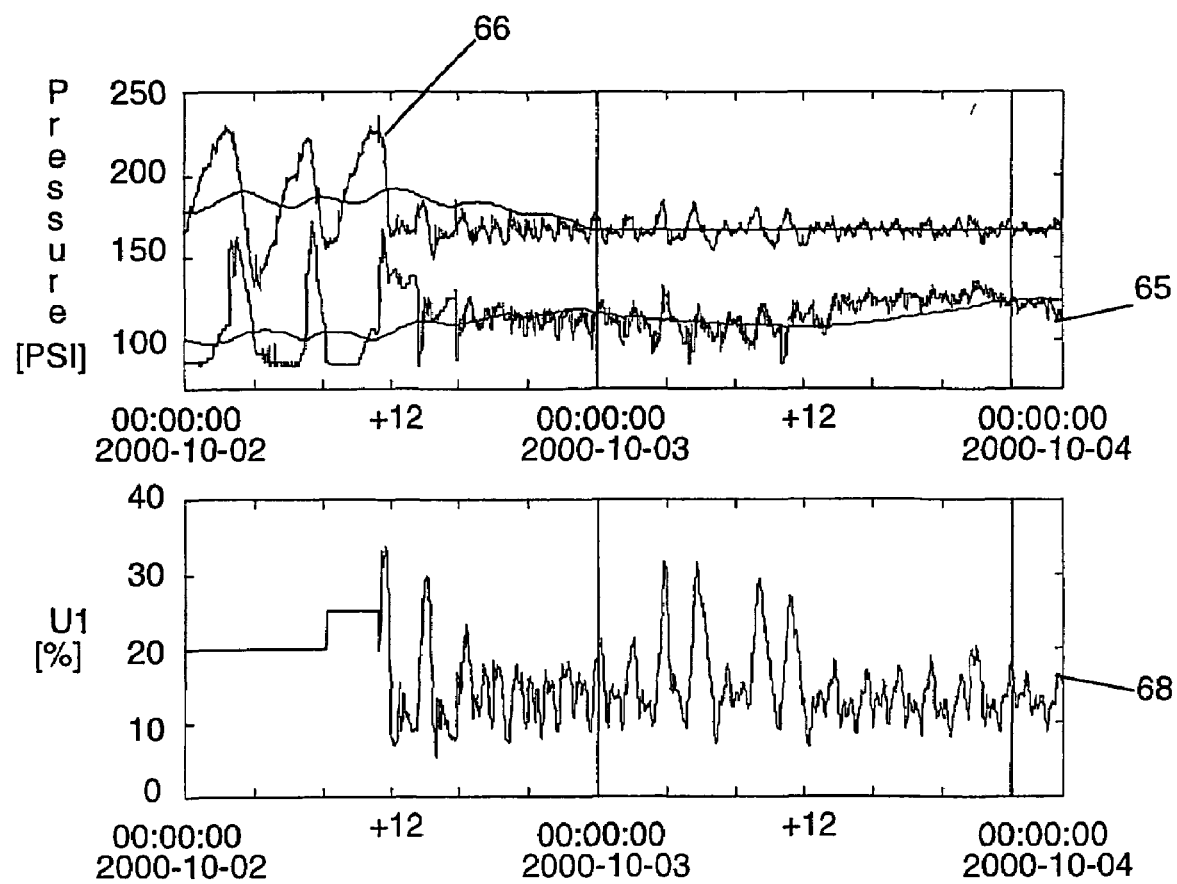
FIG. 9 shows a dynamic feedback control startup and operation of a flow line, such as a pipeline. The upper part of the figure shows pipeline inlet PT1 and outlet PT2 pressures, together with 12 h moving average in the same variables. The figure is based on the results and measurements made when applying the invention at an off-shore oil production facility.

FIG. 9 shows a dynamic feedback controller during startup and operation. The upper part of the figure shows pipeline inlet PT1 and outlet PT2 pressure. The lower part shows controller output U1. The controller is initially in manual mode. After eight hours, the manual input is changed from 20% to 25%, and the mode is changed to auto. The controller then goes into startup mode. Just before time 12 hours the controller goes from startup to auto. The controller starts to close the control valve but then opens the control valve to lower the pipeline inlet pressure. The controller stabilizes the multiphase flow in the pipeline. FIG. 9 shows that as the dynamic feedback controller is active there is a significant decrease of the swings in pressure. Due to slugging in the wells connected to the platforms the controller uses the control valve to keep the pipeline pressure PT1 and PT2 within bounds.

Figure 10:
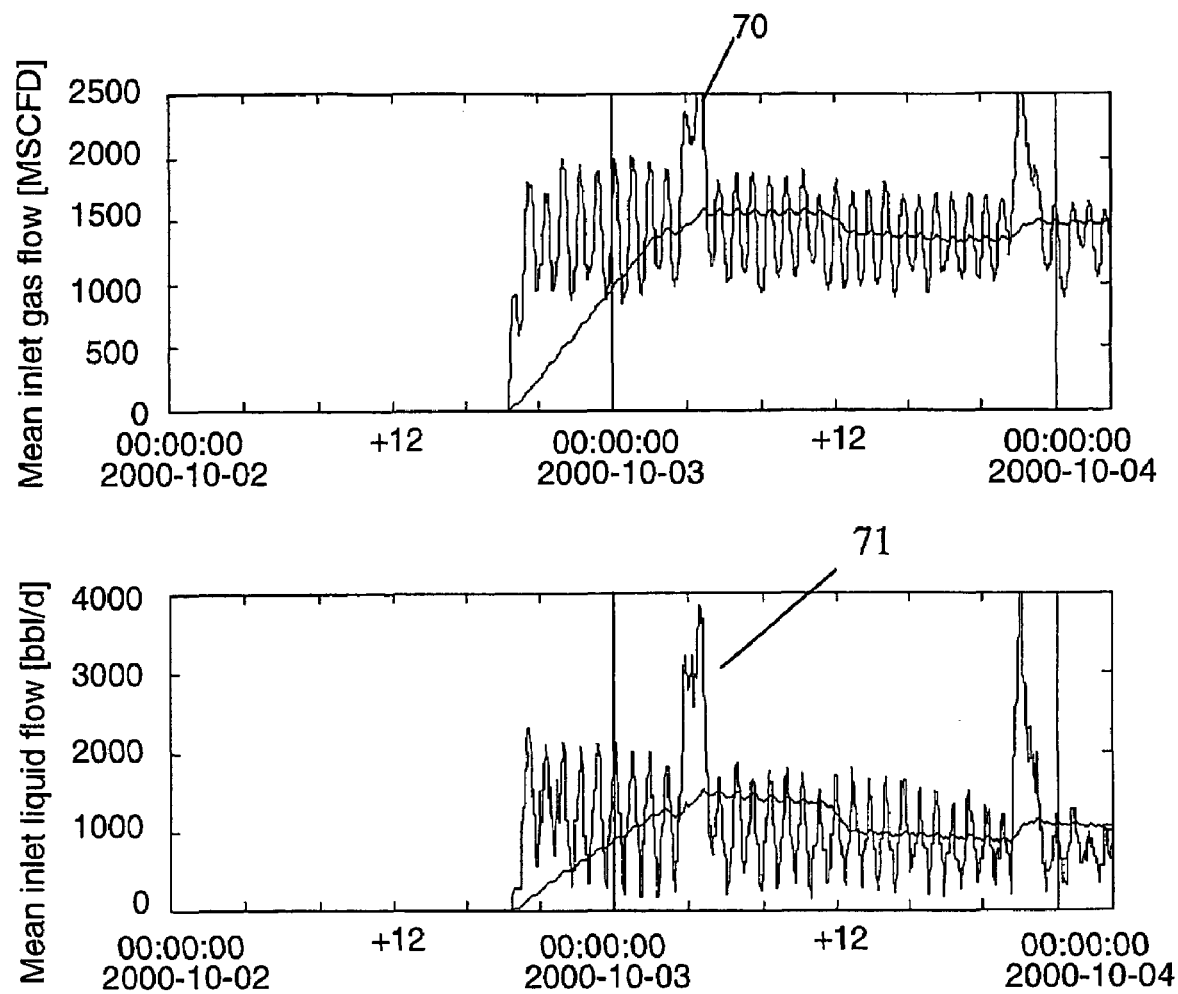
FIG. 10 shows a dynamic feedback control startup and operation of a flow line, such as a pipeline. Upper part shows pipeline inlet gas flow rate. Lower part shows pipeline inlet liquid flow rate. Both 30 minute and 8 hour moving average are plotted.

The pipeline inlet flow is shown in FIG. 10. (Remark: the missing flow measurements at the beginning of the plotted trend are due to the fact that the wells were bypassed the test separator at the platform.) The mean inlet gas flow 70 is shown in the upper part of FIG. 10. The mean inlet liquid flow is shown in the lower part of FIG. 10. As shown in FIG. 10, the input flow rates vary. These variations represent quite large disturbances, to the dynamic feedback controller. Even though there are large disturbances the dynamic feedback controller significantly reduces the slugging.

It is to be noted that the invention described above and shown in the drawings is to be regarded as a non-limiting example of the invention and that the scope of protection is defined by the patent claims.

The invention claimed is:

1. A method for stabilizing a multiphase flow in a flow line having an inlet and an outlet, where instability of the multiphase flow is caused by at least one slug, the method comprising:
    measuring continuously at least one pressure variable at a flow inlet upstream of the point where the main part of the slug is generated,
    supplying the pressure variable to a dynamic feedback controller, wherein the pressure variable upstream of the slug is an input to the dynamic feedback controller,
    calculating continuously an output of the dynamic feedback controller,
    controlling a control valve at said flow line by means of the output from the dynamic feedback controller, and
    controlling the inlet pressure of the flow line by means of the feedback controller, wherein the multiphase flow is stabilized throughout the flow line.

2. The method according to claim 1, wherein the dynamic feedback controller is a multivariable input, single output controller, acting upon periodic variations in measured variables.

3. The method according to claim 2, wherein an input variable of the dynamic feedback controller is a set-point for desired pressure at a same position in the flow line as the pressure variable.

4. The method according to claim 1, wherein the continuous calculation of output of the dynamic feedback controller is aiming at controlling the control valve in such way that a variation around a set point for desired pressure at the flow line inlet is minimized.

5. The method according to claim 1, wherein the pressure variable is either measured by a pressure measurement means or calculated from a temperature measurement.

6. The method according to claim 1, wherein the control valve is positioned at the outlet of the flow line.

7. The method according to claim 1, wherein said pressure variable is calculated based on a first measurement made at the flow line inlet and a second measurement made upstream or downstream of the control valve.

8. The method according to claim 7, wherein additional measured variables, used as input variables to the dynamic feedback controller, comprise at least one variable situated at an outlet upstream of the control valve.

9. The method according to claim 8, wherein the variable situated at the outlet upstream of the control valve is a pressure variable.

10. The method according to claim 1, wherein stabilization of the multiphase flow is enhanced by including additional measurements of flow, pressure, and temperature, or any combination thereof.

11. The method according to claim 1, wherein the dynamic feedback controller comprises a feedback stabilization calculation which is described by an equation as $$\Delta u_{2,k} = K(\Delta e_{f,k} + T_s/T_1 e_{f,k} + T_2/T \Delta \Delta e_{f,k})$$

where $T_s$ is the a sampling time, $K_1$ $T_1$ and $T_2$ are tuning parameters and $\Delta$ means $\Delta m_k = m - m_{k-1}$ and $e_{f,k}$ is a filtered control error.

12. The method according to claim 1, wherein the dynamic feedback controller has a built-in anti-windup prevention logic.

13. The method according to claim 1, wherein the dynamic feedback controller comprises a slug choking controller which is described by an equation as $$K(s) = k \frac{s}{(\tau_1 s + 1)(\tau_2 s + 1)}, \quad u_3(s) = K(s) e_2(s)$$

where $K(s)$ is a Laplace transform of the slug chocking controller, $u_3$ is a controller output, $e_2$ is a filtered nominal value for the pressure variable upstream the control valve minus the pressure variable upstream the control valve, frequencies $f_1 = 1/\tau_1$; and $f_2 = 1/\tau_2$ are tuning parameters, and k is a controller gain.

14. The method according to claim 1, wherein along with the dynamic feedback controller, a calculation for slug detection is applied.

15. The method according to claim 14, wherein the slug detection calculation utilizes a pressure measurement downstream of the control valve.

16. The method according to claim 1, wherein the multiphase flow is multiphase flow at a production facility for oil and gas.

17. A computer program product, comprising:
    a computer readable medium; and
    software code means recorded on the computer readable medium loadable into the internal memory of a computer or a process controller in a computerized control system, for making said computer or process controller carry out the steps of
    measuring continuously one pressure variable upstream of the point where the main part of the slug is generated,
    supplying the pressure variable to a dynamic feedback controller, wherein the pressure variable upstream of the slug is an input to the dynamic feedback controller,
    calculating continuously an output of the dynamic feedback controller,
    controlling a control valve at said flow line by means of the output from the dynamic feedback controller, and
    controlling the inlet pressure of the flow line by means of the feedback controller, wherein the multiphase flow is stabilized throughout the flow line.

18. The computer program product according to claim 17, wherein the dynamic feedback controller is a multivariable input, single output controller, acting upon variations in measured variables.

19. A control for a production facility for oil and gas, the control comprising:
a computerized control system comprising a computer or a process controller operative to continuously measure at least one pressure variable at a flow line inlet upstream of the point where the main part of the slug is generated, supply the pressure variable to a dynamic feedback controller, wherein the pressure variable upstream of the slug is an input to the dynamic feedback controller, continuously calculate an output of the dynamic feedback controller, and control a control valve at said flow line by means of the output from the dynamic feedback controller, and controlling the inlet pressure of the flow line by means of the feedback controller, wherein the multiphase flow is stabilized throughout the flow line.

* * * * *